US010152229B2

(12) United States Patent
Peled et al.

(10) Patent No.: US 10,152,229 B2
(45) Date of Patent: Dec. 11, 2018

(54) SECURE TRANSACTION INTERFACES

(71) Applicant: Decentralized Mobile Applications Ltd., Tel Aviv (IL)

(72) Inventors: Daniel Peled, Tel Aviv (IL); Offer Markovich, Kfar Sava (IL); Tal Shalom Kol, Hod Hasharon (IL); Alex Kogan, Herzliya (IL); Alon Muroch, Tel Aviv (IL); Guy Stein, Tel Aviv (IL)

(73) Assignee: Decentralized Mobile Applications Ltd., Tel Aviv (IL)

( * ) Notice: Subject to any disclaimer, the term of this patent is extended or adjusted under 35 U.S.C. 154(b) by 0 days.

(21) Appl. No.: 15/965,762

(22) Filed: Apr. 27, 2018

(65) Prior Publication Data

US 2018/0246623 A1 Aug. 30, 2018

Related U.S. Application Data

(63) Continuation of application No. PCT/IB2016/001670, filed on Oct. 27, 2016.
(Continued)

(51) Int. Cl.
*G06Q 20/10* (2012.01)
*H04L 12/58* (2006.01)
(Continued)

(52) U.S. Cl.
CPC ........ *G06F 3/04886* (2013.01); *G06F 3/0482* (2013.01); *G06F 3/0484* (2013.01);
(Continued)

(58) Field of Classification Search
CPC .... G06Q 20/10; G06Q 20/3223; G06Q 20/16; G06Q 20/3255; G06Q 20/36;
(Continued)

(56) References Cited

U.S. PATENT DOCUMENTS 9,405,455 B2 * 8/2016 Leem .................... G06F 3/0486
9,595,031 B1 * 3/2017 Grassadonia ........ G06Q 20/227
(Continued)

FOREIGN PATENT DOCUMENTS

WO WO-2010125577 A1 11/2010
WO WO-2017072589 A2 5/2017
WO WO-2017072589 A3 5/2017

OTHER PUBLICATIONS

Mukherjee Arnab, iMobile SmartKeys—a payment service from ICICI on your smartphone keyboard, Aug. 24, 2016, https://www.digit.in/apps/imobile-snnartkeys-a-payment-service-from-icici-on-your-snnartphone-keyboard-31463.htnnl (Year: 2016).*
(Continued)

*Primary Examiner* — Nicholas Ulrich
(74) *Attorney, Agent, or Firm* — FisherBroyles, LLP; Ariel Reinitz

(57) ABSTRACT

Systems and methods for secure transaction interfaces. In one implementation, a processing device receives, within a user input interface and while a user communication agent is presented at a display interface of a device, a selection of a transaction initiation control, presents, in response to the selection of the transaction initiation control and via the user input interface, a transaction execution control, presents, in response to a selection of the transaction execution control, identifier(s) via an identifier selection control, receives a selection of the identifier(s), transitions, in response to the selection of the identifier(s), the user input interface into a numeric input interface, receives a numeric input via the numeric input interface, activates a transaction confirmation control within the user input interface, and executes, in response to a selection of the transaction confirmation control, a secure transaction with respect to the selected identifier(s) and the numeric input.

20 Claims, 11 Drawing Sheets

Related U.S. Application Data

(60) Provisional application No. 62/323,703, filed on Apr. 17, 2016, provisional application No. 62/295,578, filed on Feb. 16, 2016, provisional application No. 62/247,193, filed on Oct. 27, 2015.

(51) Int. Cl.

| | | |
|---|---|---|
| *G06F 3/0482* | (2013.01) | |
| *G06F 3/0484* | (2013.01) | |
| *G06F 3/0488* | (2013.01) | |
| *G06Q 20/42* | (2012.01) | |
| *G06Q 30/06* | (2012.01) | |
| *H04L 29/06* | (2006.01) | |

(52) U.S. Cl.
CPC .............. *G06Q 20/10* (2013.01); *G06Q 20/42* (2013.01); *G06Q 30/06* (2013.01); *H04L 51/04* (2013.01); *H04L 63/08* (2013.01); *H04L 63/126* (2013.01)

(58) Field of Classification Search
CPC .. G06Q 20/223; G11B 19/025; H04L 51/046; H04L 51/04; H04L 51/32; G06F 3/04847; G06F 3/04886
See application file for complete search history.

(56) References Cited

U.S. PATENT DOCUMENTS

| | | | | |
|---|---|---|---|---|
| 9,648,062 | B2* | 5/2017 | Chaudhri | G06F 3/0416 |
| 9,785,340 | B2* | 10/2017 | Lemay | G06F 3/0488 |
| 9,990,125 | B2* | 6/2018 | Jung | G06F 3/04817 |
| 10,001,903 | B2* | 6/2018 | Yi | G06F 3/04817 |
| 2009/0063353 | A1 | 3/2009 | Viidu et al. | |
| 2010/0248788 | A1* | 9/2010 | Yook | G06F 3/0481 |
| | | | | 455/566 |
| 2011/0225057 | A1 | 9/2011 | Webb et al. | |
| 2013/0187861 | A1* | 7/2013 | Lavallee | G06F 9/543 |
| | | | | 345/173 |
| 2013/0212008 | A1 | 8/2013 | Edwards et al. | |
| 2014/0032414 | A1* | 1/2014 | Beisner | G06Q 20/382 |
| | | | | 705/44 |
| 2014/0058939 | A1* | 2/2014 | Savla | G06Q 20/227 |
| | | | | 705/42 |
| 2014/0089195 | A1 | 3/2014 | Ward et al. | |
| 2014/0172695 | A1* | 6/2014 | Kanjlia | G06Q 20/22 |
| | | | | 705/39 |
| 2014/0279543 | A1 | 9/2014 | Ruhrig | |
| 2015/0134508 | A1* | 5/2015 | Lucas | G06Q 20/10 |
| | | | | 705/39 |
| 2016/0110714 | A1* | 4/2016 | Norland | G06Q 20/401 |
| | | | | 705/75 |
| 2016/0117670 | A1* | 4/2016 | Davis | G06Q 20/40 |
| | | | | 705/39 |
| 2016/0171481 | A1 | 6/2016 | McElmurry, IV et al. | |

OTHER PUBLICATIONS

Dodson. B et al. "Secure, Consumer-Friendly Web Authentication and Payments With a Phone"; International Conference on Mobile Computing, Applications, and Services. [online]. Dec. 2010 [retrieved Apr. 23, 2018]. Retrieved from the Internet: https://mobisocial.stanford.edu/papers/mobicase10s.pdf, 21 pgs.
"International Application Serial No. PCT/IB2016/001670, International Search Report dated Apr. 27, 2017" 2 pgs.
"International Application Serial No. PCT/IB2016/001670, Written Opinion dated Apr. 27, 2017" 8 pgs.
"International Application Serial No. PCT/IB2016/001670, Search Strategy Document dated Apr. 27, 2017" 6 pgs.
"International Application Serial No. PCT/IB2016/001670, International Preliminary Report on Patentability dated Jan. 5, 2018" 28 pgs.

* cited by examiner

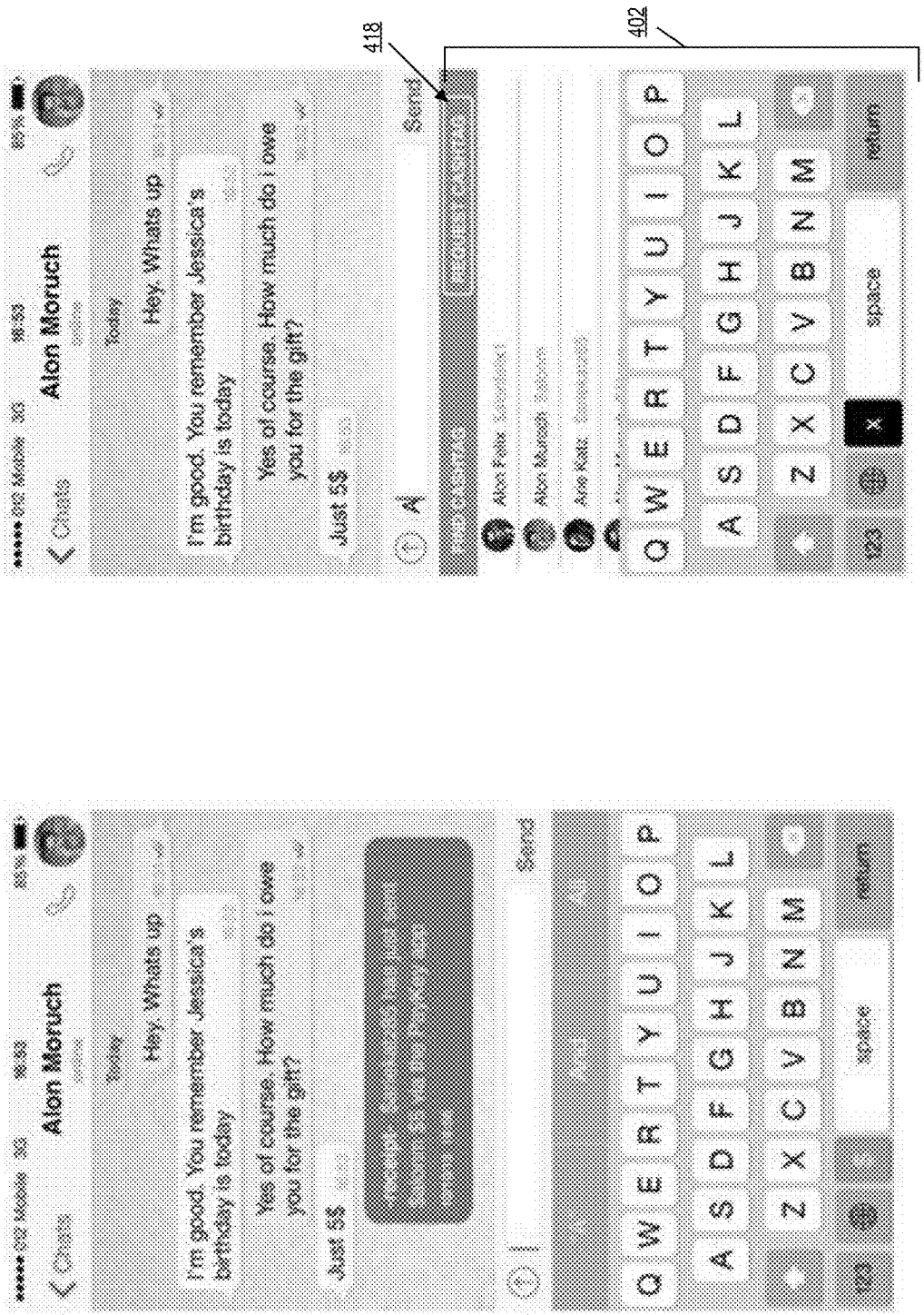

SECURE TRANSACTION INTERFACES

CROSS-REFERENCE TO RELATED APPLICATIONS

This application is a continuation of International Application No. PCT/IB2016/001670, filed on 27 Oct. 2016 and published as WO/2017/072589 on 4 May 2017, which is related to and claims the benefit of U.S. Patent Application No. 62/247,193, filed Oct. 27, 2015, U.S. Patent Application No. 62/295,578, filed Feb. 16, 2016, and U.S. Patent Application No. 62/323,703, filed Apr. 17, 2016, each of which applications and publications are incorporated herein by reference in their entirety.

TECHNICAL FIELD

Aspects and implementations of the present disclosure relate to data processing, and more specifically, to secure transaction interfaces.

BACKGROUND

Various platforms enable secure transactions to be completed between users. Such platforms require that all parties to a transaction maintain an account with the platform in order to execute the transaction.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In one aspect of the present disclosure, a processing device presenting a user communication agent at a display interface of a device. The processing device receives, while the user communication agent is presented at the display interface of the device and within a user input interface that executes on a device independently of the user communication agent executing on the device, a selection of a transaction initiation control. In response to a selection of the transaction execution control, the processing device presents one or more identifiers via an identifier selection control. The processing device receives a selection of at least one of the one or more identifiers presented via the identifier selection control. In response to the selection of at least one of the one or more identifiers, the processing device transitions the user input interface into a numeric input interface. The processing device receives a numeric input via the numeric input interface. In response to receipt of the numeric input, the processing device activates a transaction confirmation control within the user input interface. In response to a selection of the transaction confirmation control, the processing device executes a secure transaction with respect to the selected at least one of the one or more identifiers and the numeric input.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4G depicts an exemplary user interface in accordance with one implementation of the present disclosure.

FIG. 4H depicts an exemplary user interface in accordance with one implementation of the present disclosure.

DETAILED DESCRIPTION

Figure 1A:
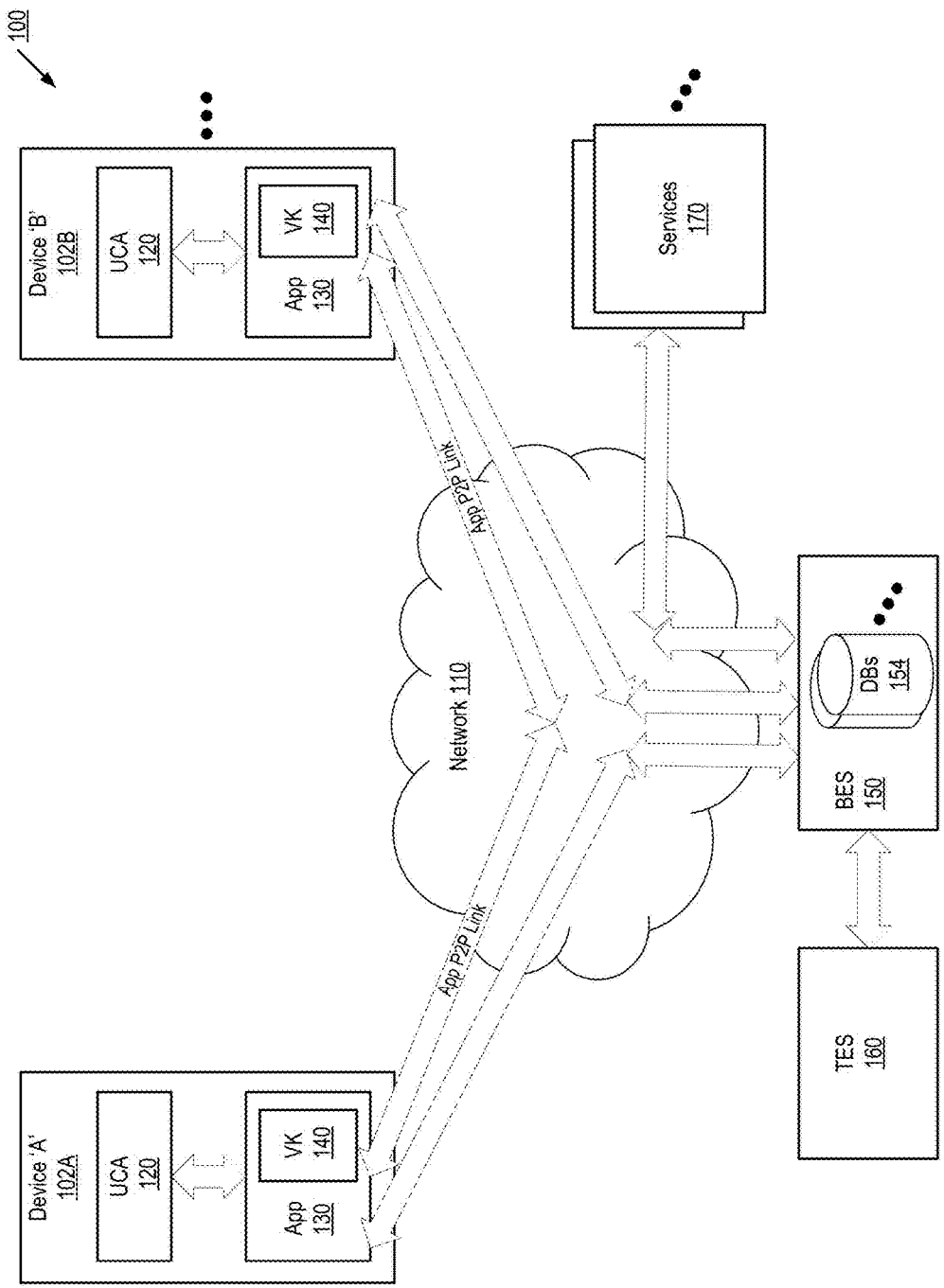
FIG. 1A depicts an illustrative system architecture, in accordance with one implementation of the present disclosure.

Aspects and implementations of the present disclosure are directed to secure transaction interfaces and integrating secure transaction capabilities with user communication agents and mobile devices. Described herein are technologies that, in certain implementations, pertain to secure transaction systems, as well as their integration with user communication agents ('UCAs'), e.g., chat and messenger application/services and/or other user-to-user communication systems, (such as e-mail, etc.).

In certain implementations, the described technologies can pertain to the integration of secure transaction capabilities with UCAs, such as through the use of user interfaces (such as user input interfaces) such as a virtual keyboard ('VK') which can be configured to interface with the UCA. Such integration can be particularly useful on mobile devices (such as smartphones and tablets) but may be used on other devices (such as those referenced herein) as well. For example, as described herein, the described technologies can enable a user to initiate and/or complete a secure transaction via a chat application, and to initiate and/or perform various related activities.

It can be appreciated that instant messaging and chat applications have become extremely popular person-to-person communication platforms and are used by numerous people worldwide. Such products may be stand-alone applications (such as WhatsApp), an element or component of a larger voice or video communication systems (such as Skype) and/or embedded into a social networking service/platform (such as Facebook Messenger). It can also be appreciated that instant messaging is heavily used in the context of social networks—even if not directly part of the social network system itself. In certain scenarios, such communications can involve or pertain to transactions such as payments. For example, as part of a communication session pertaining to product purchasing, users pooling together resources, currency, etc., for a joint purpose ("Let's all buy Mary a gift for her graduation"), person-to-person transactions/transfers ("Hi Joe—how about the beer you owe me?") or otherwise.

While some instant messenger platforms enable certain person-to-person payments within their infrastructure, such systems are limited to transactions between users of the specific messaging platform, and require both sides of the transaction to use the same messaging platform. Other platforms enable such transactions via third-party services such as e-mail or a dedicated money transfer solution. However, these products do not provide the immediacy, context and personal connection provided by instant messaging platforms.

It should be noted that third-party virtual keyboards ('VK's) (such as SwiftKey from SwiftKey Inc., London) are available for mobile operating systems, such as iOS from Apple Inc. and Android from Google. It should be further noted that, in certain implementations, the user interface (UI) for such keyboards can be displayed while other apps are running (and the VK can control input to these apps). It can be further appreciated that such VK applications can allow a third party to implement an on-screen keyboard that can be used by the user as input for various applications running on the mobile device—including messaging platform and other applications. In certain implementations, a VK application may provide additional functionality, such as predictive text correction or completion, such as based on information gathered during the user's previous use of the keyboard.

Described herein in various implementations is an improved and/or enhanced VK which can, for example, be installed on a user device and configured to provide inputs and/or otherwise integrate with UCAs such as instant messaging tools, messaging services, etc., as well as backend services (such as those that enable the execution of various transaction, e.g., services that support a per-user wallet and enable financial transactions). By enabling the referenced functionality via an enhanced VK, a vastly improved solution can be provided which can provide numerous additional capabilities and benefits, as further detailed below. For example, in certain implementations the keyboard application can include a dedicated interface and features to enable the execution of secure transactions, such as the transfer of funds/payments between users. By implementing such a keyboard, the user can, for example, connect their banking account/credit card once to a single app and then utilize this functionality in-context across multiple platforms (e.g., various messaging services, etc.). In doing so, the user can, for example, remain within the context/interface of the social platform's application and maintain the uninterrupted context of their (instant messaging) conversation while utilizing the VK to initiate/execute secure transactions within the interface of the communication session/application that the user is currently engaged in.

For example, as described herein, in certain implementations while a UCA (e.g., a messaging/chat application) and a user input interface (e.g., a keyboard/VK) may execute and be displayed at the same time, e.g., within a single user interface (e.g., the touchscreen of a mobile device which can show both the UCA and the keyboard simultaneously), in certain implementations UCA and the user input interface may execute independent of one another. In doing so, for example, inputs, etc., received within the user input interface may not be accessible by, perceptible to, received by, etc., the UCA (and/or may not be accessible, etc. by the UCA without authorization by the user). It can be appreciated that, in view of the independent execution of the user input interface, the various secure transaction operations and functionality described herein can be enabled even within, with respect to, and/or in conjunction with a UCA that otherwise may not have secure transaction capabilities).

Accordingly, it can be appreciated that the described technologies are directed to and address specific technical challenges and longstanding deficiencies in multiple technical areas, including but not limited to secure transactions, communication technologies, and user interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., (e.g., sensors, devices, etc.) referenced herein operate to enable, improve, and/or enhance the described technologies, such as in a manner described herein.

FIG. 1A depicts an illustrative system architecture 100, in accordance with one implementation of the present disclosure. The system architecture 100 includes various devices, machines, servers, and applications (which may be executed on a device, machine, server, etc., and/or in conjunction with multiple devices, etc.). These various elements or components can be connected to one another (directly or indirectly) via network 110, which can be a public network (e.g., the Internet), a private network (e.g., a local area network (LAN) or wide area network (WAN)), or a combination thereof.

As shown in FIG. 1, system 100 can include various user devices such as device 102A (corresponding to 'user A' as will be referenced herein) and device 102B (corresponding to 'user A' as will be referenced herein). In certain implementations, each of the devices 102 can be, for example, wireless terminals (e.g., smartphones, etc.), personal computers (PC), laptops, tablet computers, smart watches, wearable devices, an in-vehicle computer/system, a video camera, any combination of the above, or any other such computing device capable of implementing the various features described herein. The devices may run an operating system (OS) that manages hardware and software of the user devices. Various applications, such as mobile applications ('apps'), web browsers, etc. may run on the user devices (e.g., on the OS of the user devices). As described herein, in certain implementations each device can further have various applications installed on it which enable various operations described herein. As shown in FIG. 1A, in certain implementations, such application can include a user communication agent 120 ('UCA'), e.g. a communication application chat client such as WhatsApp) and an application 130

('app') which can be a client application responsible for the on-boarding ('OB') process, which can include feature such as: user registration, secure information (e.g., credit card, account and other financial information) setup and administration, use information tracking (e.g., such as wallet and transaction status), and/or user settings handling. The application 130 can also include a virtual keyboard 140 ('VK') which can be application that enables user input via the device, such as is described herein.

Figure 2:
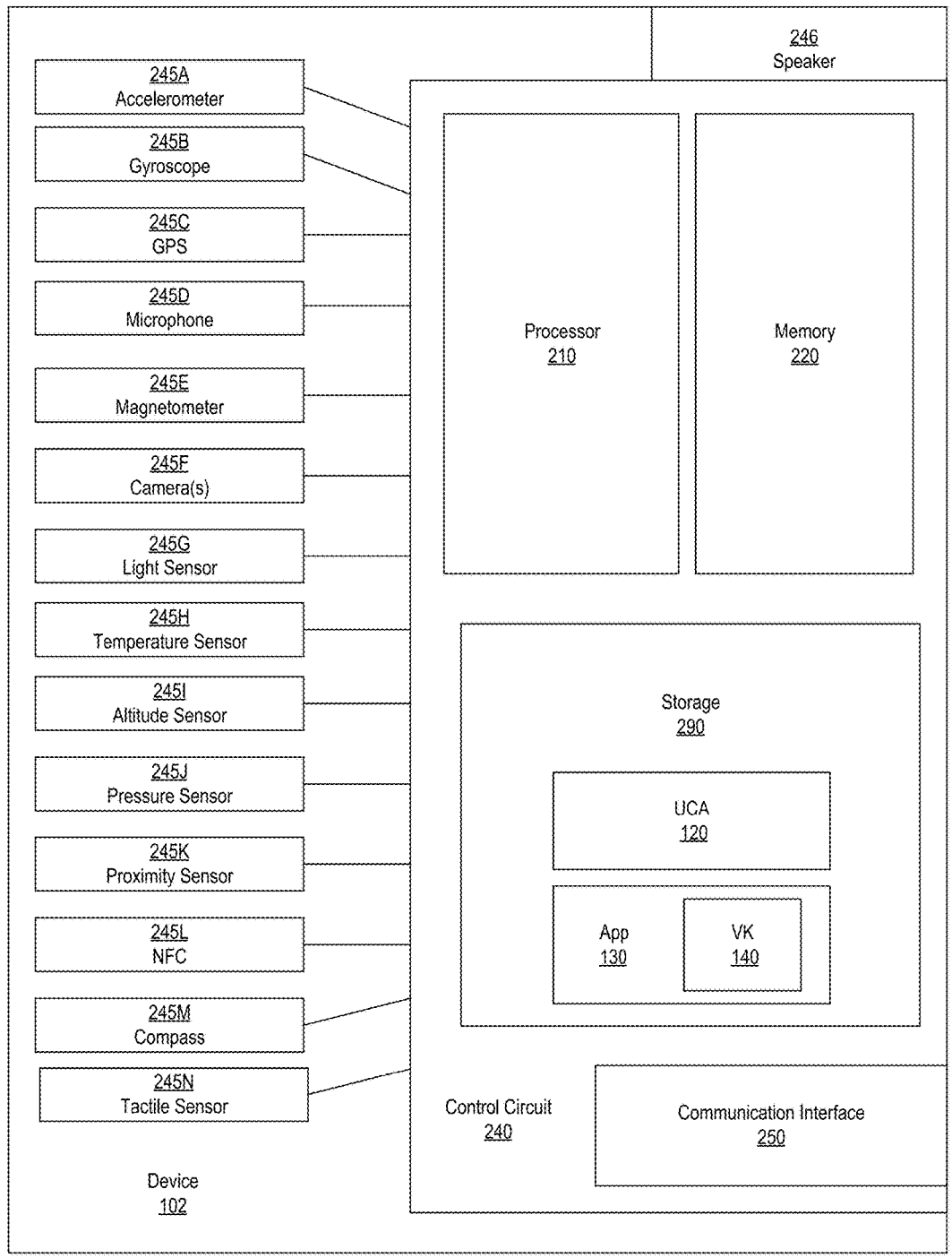
FIG. 2 depicts an exemplary implementation of a device in accordance with aspects and implementations of the present disclosure.
Figure 5:
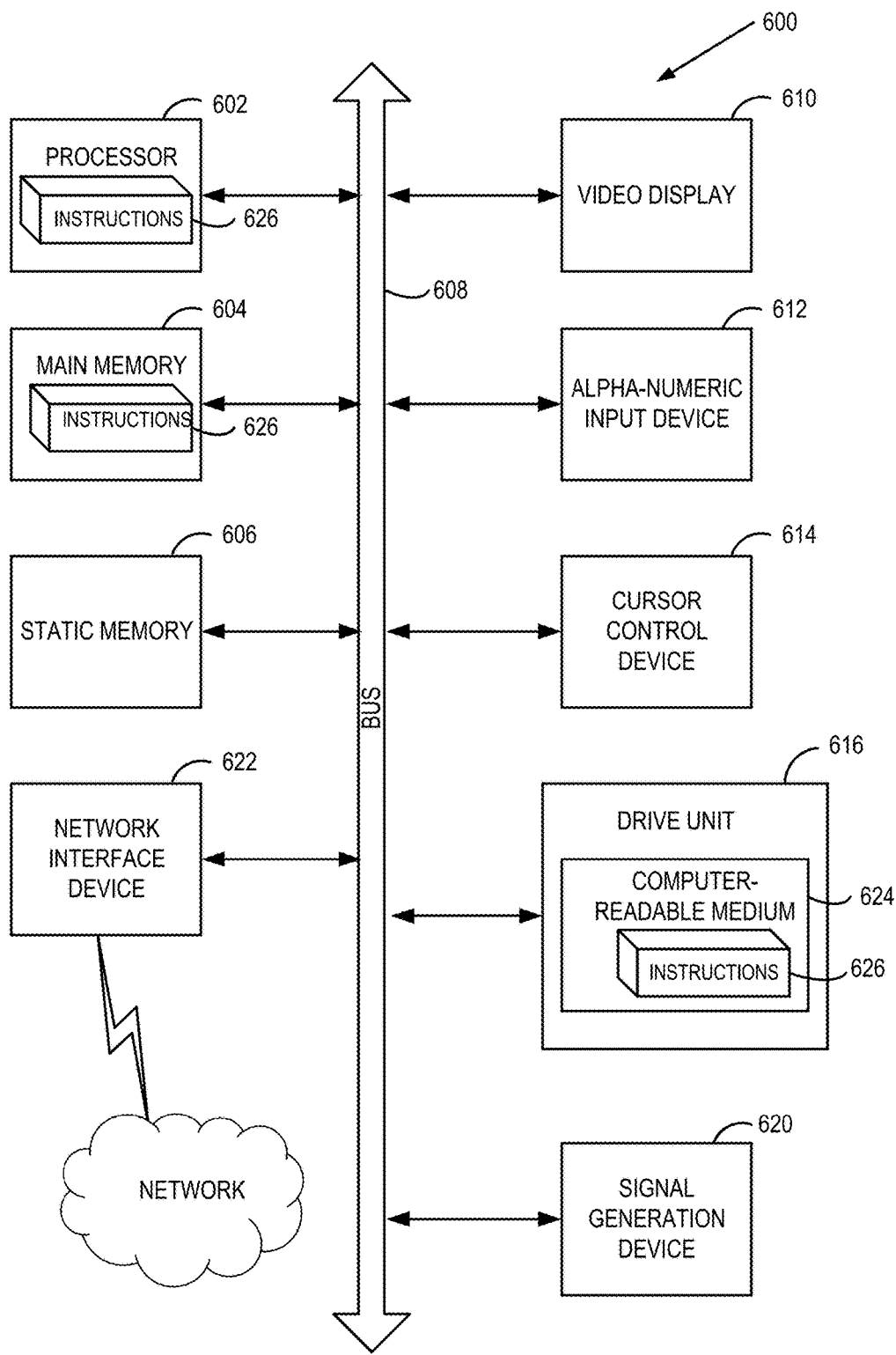
FIG. 5 depicts a block diagram of an illustrative computer system operating in accordance with aspects and implementations of the present disclosure.

It should be understood that, in certain implementations, device(s) 102 can also include and/or incorporate various sensors and/or communications interfaces (including but not limited to those depicted in FIGS. 2 and 5 and/or described/ referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. Additionally, in certain implementations user device can be connected to and/or otherwise communicate with various peripheral devices.

As noted, in certain implementations, device(s) 102 can also include and/or incorporate various sensors and/or communications interfaces. By way of illustration, FIG. 2 depicts one exemplary implementation of device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 may be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

As shown in FIG. 2, storage 290 can store UCA 120, app 130, and/or VK 140, each of which can be loaded into memory 220 and/or executed by processing device 210, in order to enable a user of the device to interact with and/or otherwise utilize the technologies described herein.

A communication interface 250 is also operatively connected to control circuit 240. Communication interface 250 can be any interface (or multiple interfaces) that enables communication between user device 102 and one or more external devices, machines, services, systems, and/or elements (including but not limited to those depicted in FIGS. 1A-1D and described herein). Communication interface 250 can include (but is not limited to) a modem, a Network Interface Card (MC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, services, servers, etc., such as those depicted in FIGS. 1A-D and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device(s) 102, various other devices, systems, servers, services, etc. (such as are depicted in FIGS. 1A-D and/or described herein) can similarly incorporate the components, elements, and/or capabilities described with respect to device 102. For example, the BES 150 may also incorporate one or more of the referenced components, elements, and/or capabilities. It should also be understood that certain aspects and implementations of various devices, systems, servers, services, etc., such as those depicted in FIGS. 1A-D and/or described herein, are also described in greater detail below in relation to FIG. 5.

In certain implementations, the respective apps (e.g., those executing at device 'A' and device 'B') can be configured to enable connections to a backend server 150 ('BES,' as shown in FIG. 1A). BES 150 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Such a BES can further enable connections to a transaction execution server 160 ('TES') which will be described in greater detail below. The respective apps executing on devices 102 may also be configured to connect and/or communicate directly with one another, thereby forming an app-to-app communication link, referred to as an 'app P2P link,' as further detailed below. It should be understood that this app-to-app link may be separate from the link used by the respective UCAs to connect with each other (e.g. to implement a communication session, chat protocol, etc.).

In certain implementations, each user account (e.g., an account associated with the app 130) can be associated with a secure repository having a unique identifier. Such a secure repository can securely receive, transmit, and maintain information associated with the user (e.g., a wallet which can receive funds). By way of illustration, when other users send payments to this user, such transactions can simply be directed to the wallet address of the recipient. Thus, the described technologies allow the user/secure repository to be represented using a unique identifier (ID). It can be appreciated that using such an identifier can dramatically increase the convenience and ease of use of the described technologies in executing secure transactions. It should also be understood that, in certain implementations, in lieu of the referenced wallet the secure repository of the described technologies can be enabled with respect to an existing secure repository, such as by utilizing the bank account, credit card, etc. of the user. For example, in order to initiate a secure transaction (e.g., send payment to another user), the unique identifier of the recipient can simply be provided. It should be understood that, in other implementations, other identifiers (e.g., existing identifiers) can also be utilized, such as email address, phone number, etc.

Users can register a unique identifier ('ID') (e.g. "johnsnow") through the app and this ID can be associated with a secure repository, account information (e.g., wallet details), etc. associated with the user. As described in detail herein, the identifier may be represented in a communication session (e.g., a chat session) using a one or more prefix character(s) (e.g., '$')—thus, for example, using "$johnsnow" can represent the user "johnsnow" with respect to the various secure transaction described herein. The registration of ID's can be managed on a server (such as 'BES' 150) as further noted below.

The referenced IDs (e.g., alphanumeric IDs) can be easily shared and utilized on mobile platforms. They may be easy to remember and can be typed or input directly (much like email addresses). Another convenient feature is copy-paste. user A sends his ID via chat to user B. User B copies the ID to clipboard using a 'copy' command/operation. The described technologies (e.g., the 'app' as executing on user B's device) can be configured to interface with the device's/system's clipboard and determine that an identifier has been placed there—and can further automatically copy the identifier from the clipboard (e.g., without requiring an explicit 'insert' operation by the user).

The identifier may also be used to specify that a transaction is requested. For example, the user 'johnsnow' may utilize the described technologies to initiate a secure transaction such as by requesting a payment of $10 using a chat message in the form "$johnsnow+10", thereby initiating a transaction sequence as noted below.

The described technologies may also support a number of ways in which the referenced identifier may be represented or encoded, as further detailed below. For example, in certain implementations, an identifier can be encoded as a URL—e.g., "http://gems.org/johnsnow." The benefit of encoding the identifier as a URL is to increase/enhance integration within mobile platforms and since apps can register themselves as URL handlers. By way of further example, the URL 'http://gems.org/johnsnow_20' can reflect a request of 20 USD by user 'johnsnow.' Thus, if the app is installed/available on the device, when the referenced URL is clicked or otherwise selected, the OS can launch it in order to handle the click and open a dedicated user interface ('UI') to handle this action (e.g., a 'send payment' dialog to this address). If the app is not installed, when the URL is clicked, a regular HTTP web page will be served (e.g. from the gems.org web site) which can direct the user towards downloading and installing the app and performing the on-boarding process.

In other implementations, the referenced identifier can be encoded as a QR code (or bar code, or any other such format) which can be printed or displayed and then scanned by the appropriate scanners (such as the smartphone's built-in camera), processed, and activated (thereby activating the app or its installation, as noted above).

In yet other implementations, the referenced identifier can be encoded within an existing image. The identifier can be encoded inside an image—for example a user's avatar or profile picture in a social network. This encoding may not alter the image to the human eye, so the avatar can visually remain the same. Upon decoding the image, the app can identify an encoded image containing an identifier and extract the identifier from it.

Images are also well integrated in mobile platforms. Thus, the app may receive such image in a number of ways, including but not limited to (for example): Many mobile applications support direct sharing of images to other installed apps (the app can register itself as a 'share handler'). Additionally, in certain implementations images can be saved to the user's photo album on the device. The app can then scan the photo album and locate relevant (recently added) images. Images may also be copy-pasted, so the recipient of the image can copy it and have the app access it directly from the clipboard. The app may also scan the screen (e.g., using screen capture) to attempt to detect an encoded image, with such scanning being adapted to the display structure of various communication applications (e.g., messaging application) (i.e. focusing on the area in which the "other user" avatar is likely to be displayed).

Using the various representation and transfer techniques referenced above, in certain implementations the app 130 may receive the identifier of the user conversing with the current user when a transaction is to be performed.

In certain implementations, various secure transactions can be executed with respect to 'claimable currency,' which can be a set amount of money (or other such value) which can be shared between users. The shared element can hold the value until it is claimed by its recipient. Once claimed, the actual value transfers into the recipient's wallet and the shared element loses its value. In certain implementations, such claimable currency may be locked to a specific recipient address (by using the user's ID as described above). It may also be unlocked so anyone can claim it. The benefit of keeping it unlocked is that a sender can send this amount without knowing/providing the recipient's ID.

In certain implementations, the secure transaction can be initiated by the recipient 'A' requesting that a specific amount be sent (e.g. by sending the message "$abc+10" in the chat program to the sender 'B'). Such a message may be intercepted or transferred to the VK part of the app on B's device, and can initiate a secure payment transaction. 'B' can approve the payment, and specify any additional attributes (as detailed below).

In another case, user 'B' can initiate payment (locked to 'A' or open to "anyone who claims that transaction") with a specific request from A. For example, 'A' might be seeking donations or funding, and allow anyone connecting it to send a transaction ID embodiment a set amount of claimable currency.

In certain implementations, a unique transaction code (e.g. "eKbDSw") can be generated which can then be sent to the recipient 'A' (via the messaging application) so that 'A' can claim the amount sent. In certain implementations, the transaction ID generated by the system can also include the amount, so the actual ID (for sending $10 to the referenced recipient) would be "10+eKbDSw".

It should be understood that the referenced transaction ID may be represented or encoded in any number of ways, examples of which are further detailed below.

For example, in certain implementations the transaction ID can be represented as an alphanumeric unique ID. To do so, a transaction ID ("10+eKbDSw") can be generated and can be inserted into the chat conversation. To claim the amount, the recipient 'A' can type or copy-paste the transaction ID into the app, or otherwise bring it into the app (as noted below).

In other implementations, the transaction ID can be represented as a URL. To do so, the transaction ID can be encoded as a URL—e.g. 'http://gems.org/10-eKbDSw' and when the recipient (e.g., 'A') selects (e.g., clicks on it), the app (if installed) can be activated to complete the transaction, or open the web page (if the app is not installed)—which would direct the user 'A' to download and install the app.

In yet other implementations, the transaction ID can be represented as a QR code. To do so, a URL can be encoded as a QR code which can be printed or displayed and then scanned with appropriate scanners. Thus, it can be used to decode the transaction ID's URL form.

In yet other implementations, the transaction ID can be encoded within an existing image. For example, the ID can be encoded into practically any image, as described herein. This can be used for branding, e.g. for generating a branded stock image of a bank note or check. In doing so, recipients can hold on to this visual currency in their photo album until it is claimed.

It should be noted that unlocked claimable currency—which may not be locked to a specific user ID—can be fully endorsable. For example, the recipient of the transaction ID can endorse this ID to any third party which can claim it or further transfer it. Furthermore, the original sender (or any recipient) can distribute it to multiple persons, and the first to claim it will receive the amount. This can be limited by various transaction attributes and conditions as defined below. It should be understood that such a system may rely on the security of the underlying UCA, e.g., to prevent claim of the amount by a person other than the intended recipient.

The described technologies may also define a default expiration policy for funds which were not claimed after a certain period (e.g. 6 months), or allow such funds to be "in transit" for unlimited time.

It should be understood that various attributes and/or conditions can be defined with respect to a particular secure transaction including but not limited to: payer/initiator ID, payee/recipient ID (or unspecified), amount to be paid, transaction date, generated transaction ID. In certain implementations, the transaction definition can also indicate or reflect whether the transaction is endorsable—e.g., for payments to an unspecified payee (i.e. not locked to a specific recipient), but may also be enabled for transaction with a specified payee, allowing the payee to endorse the transaction to a third party without claiming it first.

In certain implementations the described technologies may also implement additional attributes. Some of these attributes may indicate claiming conditions—under which the recipient/payee can claim the amount if the conditions are met. One purpose in setting such claiming conditions is increased security and blocking claims for the funds by unauthorized parties. Such conditions may include but are not limited to: earliest date to claim, latest date to claim (expiration), lock to geographic area/region (for example, an approved claim for the referenced transaction may only be performed when the app is executing on a mobile device located in a given physical region, e.g., as determined though the mobile device GPS receiver or other mechanism). Such locking may improve the security of the described technologies.

The described technologies may also restrict or lock certain transactions to specific recipient attributes combinations (such as specific mobile device, system characteristics, IMEI, IMSI, MAC address, browser version etc.). Additionally, in certain implementations the described technologies may also restrict or lock certain transactions to additional password/ID/biometrics, and/or other such identifiers/authenticators. Such an additional per-transaction key can (for example) be transferred in a separate channel to ensure the transaction is claimed by the right person.

Additionally, in certain implementations the described technologies may also restrict or lock certain transactions to external condition(s). For example, interfaces can be provided to various delivery services, logistics/shipping companies, etc. (such as FedEx and UPS), and the secure transaction can be executed/completed (and the funds associated with the transaction can be released) upon receipt of a positive indication that a package was shipped (e.g., from the location of the payment recipient to the location of the payment sender). Such a condition may, for example, be tested or confirmed against a web service, API, etc. provided by the shipping company. In certain implementations, the payer can include specific conditions defined (for example) through a scripting language or other mechanism.

The described app/VK combination, in coordination with the UCA, provides a simple, dedicated on-screen UI (e.g. "just specify the amount you want to send") through which a user can interact in order to initiate and execute secure transactions. The app/VK can process the inputs received and perform the various encoding, decoding, communication and front-end functions (in conjunction with the BES providing the back-end functionality), such as is described herein. Various aspects of the app/VK are more fully described herein.

When initiating a secure transaction (e.g., to send the money), various corresponding UI elements can be provided to enable the payer to specify one or more of the attributes, conditions, identifiers, etc., referenced above and herein. These conditions can be stored together with the rest of the transaction information, and are enforced by the described technologies.

It should be understood that the complexity associated with various aspects of the described encoding process (e.g., user representation/sent money representation/transaction attributes) can make it difficult or impossible for a user to perform such operations manually using a standard keyboard. Accordingly, the described VK can be particularly advantageous in such scenarios as it provides the ability to offer a dedicated on-screen UI (e.g. "just specify the amount you want to send"), the ability to perform the encoding process for the user, and deliver the output to the other party through the UCA. In addition, the user does not need to remember and type tedious addresses.

Figure 1B:
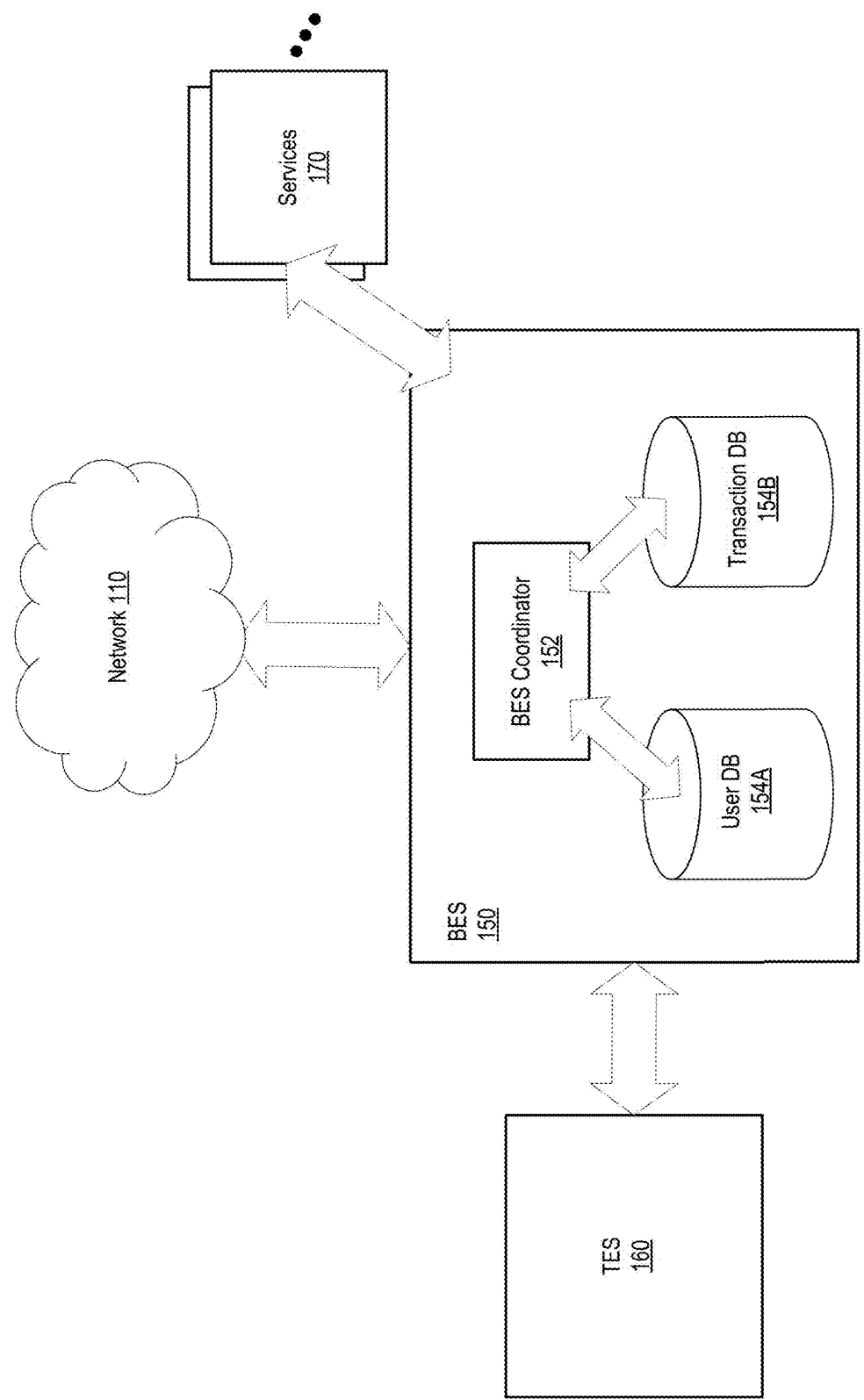
FIG. 1B depicts an illustrative system architecture, in accordance with one implementation of the present disclosure.

In certain implementations, the 'BES' 150 implements the back-end storage, authentication and information handling for the described technologies. As illustrated in FIG. 1B, it can include a BES coordinator 152 (which can be a service, engine, application, etc., to manage the functionality of the BES, such as the functions described herein) and various databases such as a user database 154A and/or a transaction database 154B. User database can, for example, store the identifiers (and other such accounts, information, etc., associated with various users of the described technologies) as described herein. Transaction database can, for example, store information, parameters, settings, etc., associated with pending and/or completed transactions, such as those described herein. In certain implementations, databases 154A-B may be hosted by one or more storage devices, such as main memory, magnetic or optical storage based disks, tapes or hard drives, NAS, SAN, and so forth. In some implementations, such databases can be a network-attached file server, while in other implementations the databases can be some other type of persistent storage such as an object-oriented database, a relational database, and so forth, that may be hosted by the server 150 or one or more different machines coupled to the server 150, while in yet other implementations the repository may be a database that is hosted by another entity and made accessible to server 150 and/or other devices.

BES coordinator 152 may also manage or mediate app-to-app communication (as further described below). The BES can include the full infrastructure for handling of monetary user accounts and user transactions, including the requisite transaction management system, failure recovery, backup, journaling etc. The BES may further connect to various external services 170, e.g. as required to implement external authentication for transaction conditions (as described above).

The BES can also be connected to the TES 160 (transaction execution service) which may be can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein implemented in any number of ways. For example, The TES can be the computing infrastructure of one or more financial institutions (e.g. banks) and the BES 150 interacts directly with the banks' accounts and transactions. The TES can also be implemented via an interface to a 3rd party payment system (e.g., as provided by Paypal Inc.). The TES can be implemented as part of the described technologies and provides the required financial back-end services. In such a case the user's wallet can be a depository account within the described technologies, and the TES can provide money transfer gateways to bring money in and out of the described technologies.

In one exemplary scenario in which one user requests money from another user, user 'A' can utilize the VK to request $10 from user 'B' via a WhatsApp message. He types the amount in the keyboard and clicks a button to request. The VK generates a message with the request (the wallet address plus amount) represented as a URL+encoded inside an image (like a bank note with the requester's avatar). By way of illustration, such a URL can be: 'http://gems.org/MyName?amount' or 'http://gems.org/rt4Kd1A' where 'rt4Kd1A' is a unique alias for this specific request. User B can receive the message via WhatsApp and click on the link. The app handles the click and shows a confirmation dialog. user B confirms and the amount is transferred from user B to user A.

In certain implementations, user B can also perform the action manually on the image by sharing it to the app or copying it and having the VK handle it from the clipboard. This process might also be completely automatic since WhatsApp auto-saves received images to the photo album and the app can access the album and identify/determine that a new image with a request is present and present a dialog to the user the next time the keyboard is used.

In another exemplary scenario in which one user sends money to another user, user A opens the VK to send $10 to user B via a WhatsApp message. He types the amount in the keyboard and clicks a button to send. The keyboard generates a message with the amount (a claimable currency of the desired amount) represented as a URL and encoded inside an image (which may appear like a bank note with the sender's avatar). Notice that the claimable currency can be unlocked to a recipient since the recipient is unknown to the keyboard.

User B then receives the referenced message (e.g., via WhatsApp) and the image may be automatically saved to his photo album. Some time passes and user B decides to claim the amount into his bank account. He opens the app which scans all images in the album and finds the unclaimed amount and guides the user through the claim process.

User B may also perform the action manually on the image, e.g., by sharing it to the app or copying it and having the VK handle it from the clipboard. This process might also be completely automatic since WhatsApp auto-saves received images to the photo album and the app could determine that a new image is present with a request and present a dialog to the user on the next time the keyboard is used.

User B may also click on the link in the received WhatsApp message. The app handles the click and shows a dialog that guides the user through the claim process.

As noted above, each user can be identified by an identifier/email/phone number—which can be a user ID for the described technologies which may be created, assigned, etc. through the app's on-boarding process. The identifier is stored (together with the other details provided by the user) on BES 150 (e.g., at user DB 154A). In certain implementations, the described technologies can also identify a recipient through his/her identifier. However, the described technologies may also utilize additional/alternative identification mechanisms, including but not limited to: the user's phone number or the user's e-mail. Additionally, in certain implementations the described technologies may allow the user to identify itself in other ways, which are linked to the identifier. For example, identifier can be associated with another platform identity, such as the one provided by Facebook, LinkedIn and other platforms. Additionally, in certain implementations the identifier can be associated with general-purpose user identity management systems such as authentication systems such as Google ID, apple ID, Microsoft Account web service, Apple ID etc. Moreover, in certain implementations, biometric identification can be utilized, including inputs received via sensors embedded in the mobile device (e.g. Apple's fingerprint reader). Additionally, in certain implementations data physically embedded in the mobile device can be utilized, such as IMEI, IMSI (SIM), MAC address, etc.

It should be further understood that the referenced additional identification mechanisms, identifiers, etc. may also be used for additional purposes. For example, such identifiers may be used as additional security mechanism (similar to username/password combination) when starting the app, e.g., in order to check that the phone wasn't stolen. Additionally, in certain implementations the referenced additional identifiers can be used as claiming conditions (as defined above) to further secure transactions, and/or as another means of identifying the other party (e.g., in case their UPID is unknown, but a different identifier is known).

It can be appreciated that, in certain implementations, the VK (e.g., a keyboard application) may have access to information typed/inputted by the user with respect to other applications (such the UCA, e.g. the chat client). For example, as the user types on (or otherwise provides inputs—e.g., voice inputs, gesture inputs, etc., into) the VK, the VK receives such inputs, processes them, and/or transfers the (possibly modified) keyboard events to the application (e.g., the UCA) that the VK is currently activated with respect to. Thus, the app can be provided with full access to the outgoing messages of the UCA (which, as noted, are generated/provided by the (VK).

However, it should be noted that some mobile operating systems do not provide a similar mechanism for transferring information from the UCA (e.g., a messaging application) to the VK. That is, the VK may not necessarily automatically receive the information displayed by the UCA (and viewable by the user) (such as incoming messages received from other users via the UCA). It should be understood that such information may be relevant to the described technologies in order to, for example, detect the identity of the other party to the conversation and/or detect incoming message (e.g. such messages containing incoming money transfer or money request).

Accordingly, in certain implementations, URL schemes can be utilized. For example, the app may intercept URLs clicked on a mobile device. Thus, if information is sent to the user via textual chat (or QR-based) URL, he can click on the URL and the app will be activated with the URL information. The VK could then handle the event appropriately.

The described technologies may also provide additional ways to transfer information from the UCA to the VK, including copying the relevant information into a clipboard. As noted above, the described technologies may detect that relevant (or appropriately structured) information was placed in the clipboard and access it automatically, e.g., without requiring additional steps from the user (i.e. performing an explicit "paste" operation).

In other implementations, such information transfer can be enabled though screen capture and OCR techniques. For example, the described technologies may perform periodic full or partial screen capture, and process the captured image(s) through an OCR engine adapted to read screen fonts. The described technologies may also preserve previous screen shots, in order to detect changes in displayed information. By focusing on specific areas in the displayed UI, the described technologies may capture pertinent information, including chat counter-party and displayed messages. The described technologies may also be adapted to multiple popular UCA types and versions (e.g., messaging applications), in order to determine where to find text just received, which font and sizes are used, how to classify information according to the color scheme and position in the UCA's UI framework, etc.

In yet other implementations, such information transfer can be enabled by 'sniffing' (listening) to the UCA's communication channel. For example, the UCA can use a communication channel to transfer incoming and outgoing message from/to UCAs installed on other machines. Various techniques can be employed to listen ("sniff") to such communication. Thus, the app may listen to such communication, identifying/zooming in on the packets related to the specific UCA (which can be identified based on TCP/IP port numbers and/or packet structure), and extract the transferred messages. For example, in scenarios in which the UCT-to-UCA protocol is visible, the app may process this communication information and extract the incoming chat data.

In yet other implementations, such information transfer can be enabled by listening to a system internal channel: Similar to the communication sniffing technique referenced above, the app may listen to internal system communication paths, which pass displayed information.

In yet other implementations, such information transfer can be enabled by decoding sent picture information: As noted above, the app may detect picture(s) containing encoded URL's or ID's. The pictures to be detected can be received through various techniques described above (e.g. by analyzing screen display or communication 'sniffing'). A newly arriving picture may also be detected as they are saved to the mobile device's picture album. Some UCAs may save an incoming picture automatically, while some UCAs may require the user to explicitly save the picture to the system's album. The UCA may also support manual dragging and dropping of arriving picture into the app. The app can analyze such incoming picture(s) to determine if it contains any encoded URL or other system object (such as an identifier, a transaction ID or a money request) and acts upon this incoming object.

In yet other implementations, such information transfer can be enabled though a UCA-to-app interface: In some cases, an explicit/direct integration can be created between the UCA and the app/VK. This can be through an API or web service provided by either program (UCA or App/VK) and accessed by the other. In addition to all of the methods above, the app may attempt to determine/infer information about incoming messages from the accumulated information contained in outgoing messages. Thus, the keyboard may analyze (e.g., using a natural language processing analysis engine) the outgoing messages, and detects (for example) the other party with whom the messaging session is occurring—based on explicit chat "handle" or other names or nicknames or identifiers used in the typed text.

It should be understood that the described techniques can be used alone, and/or in conjunction with (and to improve) one another.

Using techniques pertaining to encoding system objects (e.g. money request, identifier, or transaction ID) inside images, the described technologies can support a number of user interactions. One example is personalized currency/money: A user can take an image and embed a monetary (or other) value into it—creating branded "cash" which can be used/transferred to other user(s). For example, a parent may create personalized cash which is given to a child (e.g. for the child's weekly allowance). The described technologies may also support the creation of such personalized images, e.g. extracting a person's head/face image from a given image and converting it a "personal banknote" featuring an image of the person's, a personal message and the value of the "banknote". A created "personal banknote" may also contain two such images (e.g. the parent and the child's faces) so as to mark a 'locked' payment which can only be redeemed by the child. Such an image may be automatically generated from a picture captured by the mobile device camera (e.g. through a face analyzer module and a banknote generator module as noted above). The user would, for example, just drag the picture from the VK into the UCA's text area to send the payment.

Another example pertains to associating product(s) with a payment request. For example, an e-commerce merchant may post product images which include an embedded money request (e.g. "Merchant $MerchantName requests $25"). Such images can be marked as such, and the user may be able to just drag the picture with the embedded payment information into the VK (or otherwise share it with the VK) to affect the payment.

Another example is the creation of gift card: These could be created with the appropriate conditions (i.e. locked or not and possibly endorsable as noted above) and be provided to the recipient so he could spend them. The ability to endorse a transaction allows for such a card to be locked to a given person (identifier), and yet transferable to various merchants (e.g., for payment in exchange for goods/services). In certain implementations, such gift card may be redeemable for digital goods consumable on the recipient's mobile device as further detailed below.

Yet another example is a payable products list: This could be a regular product list (e.g., in an e-commerce site), or a special purpose list such as a gift list (e.g. a wedding present list). A gallery could be created with item pictures embedding a payment request by the relevant merchants. The pictures can be marked (e.g., using special marking such as a diagonal badge), so users can identify them as "payable pictures". This gallery can be hosted on a server (for example), and potential wedding guests (in this example) could just drag their preferred present to their VK to order the present. The server can be configured to remove the relevant picture (or mark it with a "taken" badge, for example) once the specific gift was successfully ordered. Note that since each picture includes its own payee information, a single such list may enable purchasing goods from multiple vendors. Additional examples are discussed below (e.g., regarding the described technologies use with physical products).

Figure 1C:
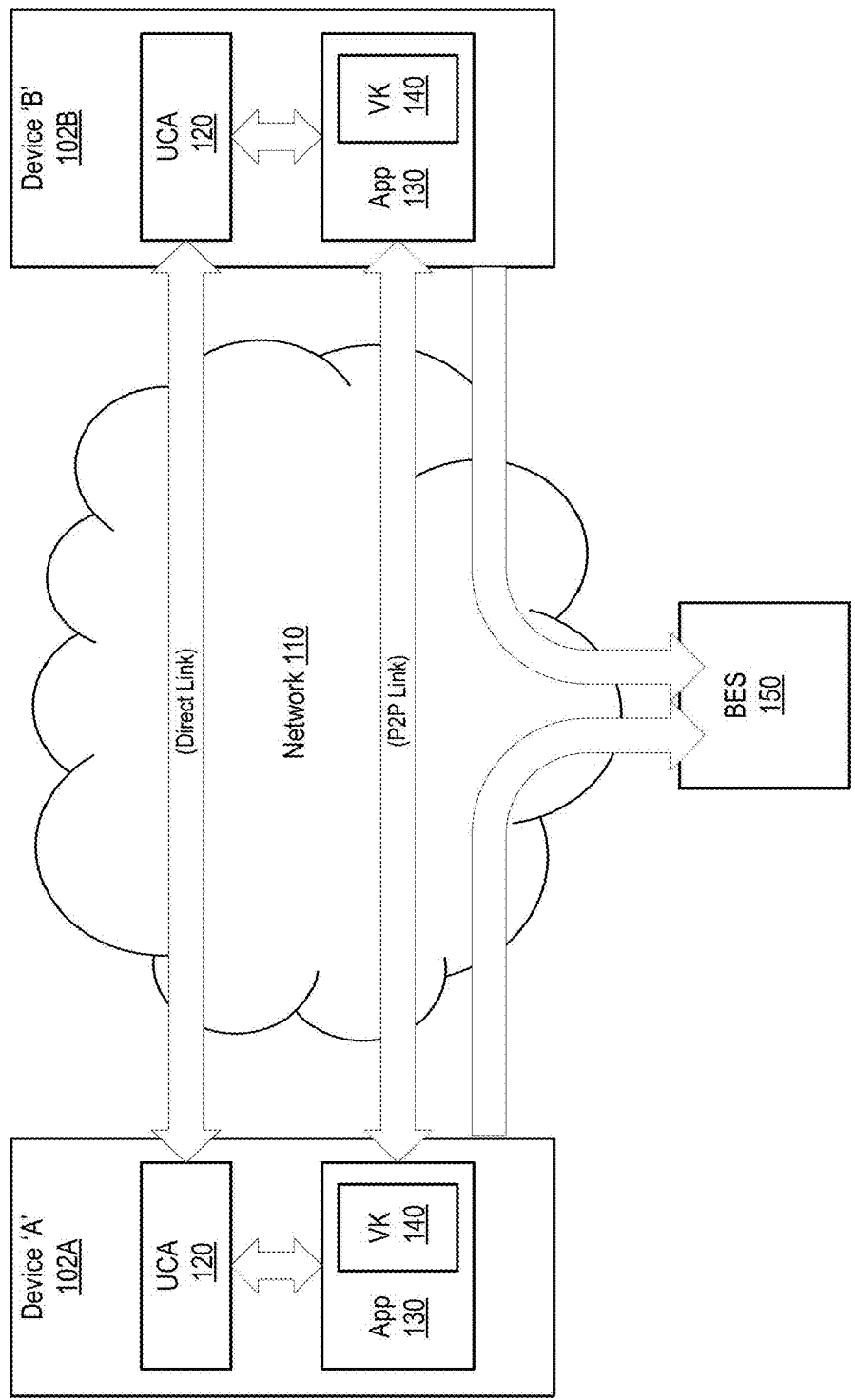
FIG. 1C depicts an illustrative system architecture, in accordance with one implementation of the present disclosure.

FIG. 1C depicts further aspects described herein. As illustrated in FIG. 1C, in certain scenarios the app may communicate directly via the referenced "P2P link". Such communication may be actual P2P (peer-to-peer) communication (i.e. app-A and app-B connecting/communicating directly with each other without involving an external component). It may also be mediated communication, e.g., with the described technologies' BES mediating the communication—facilitating an initial connection between app-A and app-B, or even acting as a communication bridge for the entire communication session. Such P2P link communication can be used in many ways, such as is described below.

In certain implementations, such a P2P link can be used for information sharing: As noted above, a money request or money transfer may be sent from A to B as a URL. If the recipient B does not currently have the app 130 installed on his/her device 102, the sent URL can redirect B to download and install the app and perform the on-boarding process (which would create B's identifier). Once thus installed, the now running app-B can provide user B's newly created identifier to user A. This can be done using the P2P link (or though the BES) to save A from having to copy it manually to App-A (if it would be sent through the UCA).

In other implementations, such a P2P link can be used as secure/parallel channel: The two communicating chat participants may not trust the chat platform to exchange some sensitive information (such as passwords). The P2P link may provide additional "mini-chat" capabilities which are separate (and which may be encrypted and/or otherwise secured) to exchange this additional information. The mere fact that the sensitive data is transferred from device A to device B using a different channel from the regular chat session between them provides additional security, as an eavesdropper would need to intercept the two channels simultaneously to get (for example) a username passed on the regular chat and a password passed on the P2P link.

In yet other implementations, such a P2P link can be used for continuous session billing: As described below, the described technologies may support continuous session billing for pay-as-you-go sessions. Such billing can be performed via P2P link so as not to interfere with the UCA communication.

In yet other implementations, such a P2P link can be used when user A and user B are not on the same chat platform: The app 130 may provide its own version of "which of my friends is on-line" functionality—even if different friends/users use different UCA platforms (e.g. some use Skype and some use Facebook messenger). The app may also activate the appropriate UCA (e.g. chat client) for the specific friend, e.g. based on its history, log, record, etc. of previous communication sessions between this friend and the app user.

In yet other implementations, such a P2P link can be used for added content: The app may provide its own form of bonus points or pseudo-currency, such as "friend likes" which users may award to each other. These could be shown next to each "connected friend", so as to provide a metrics of affinity to the user.

Figure 3:
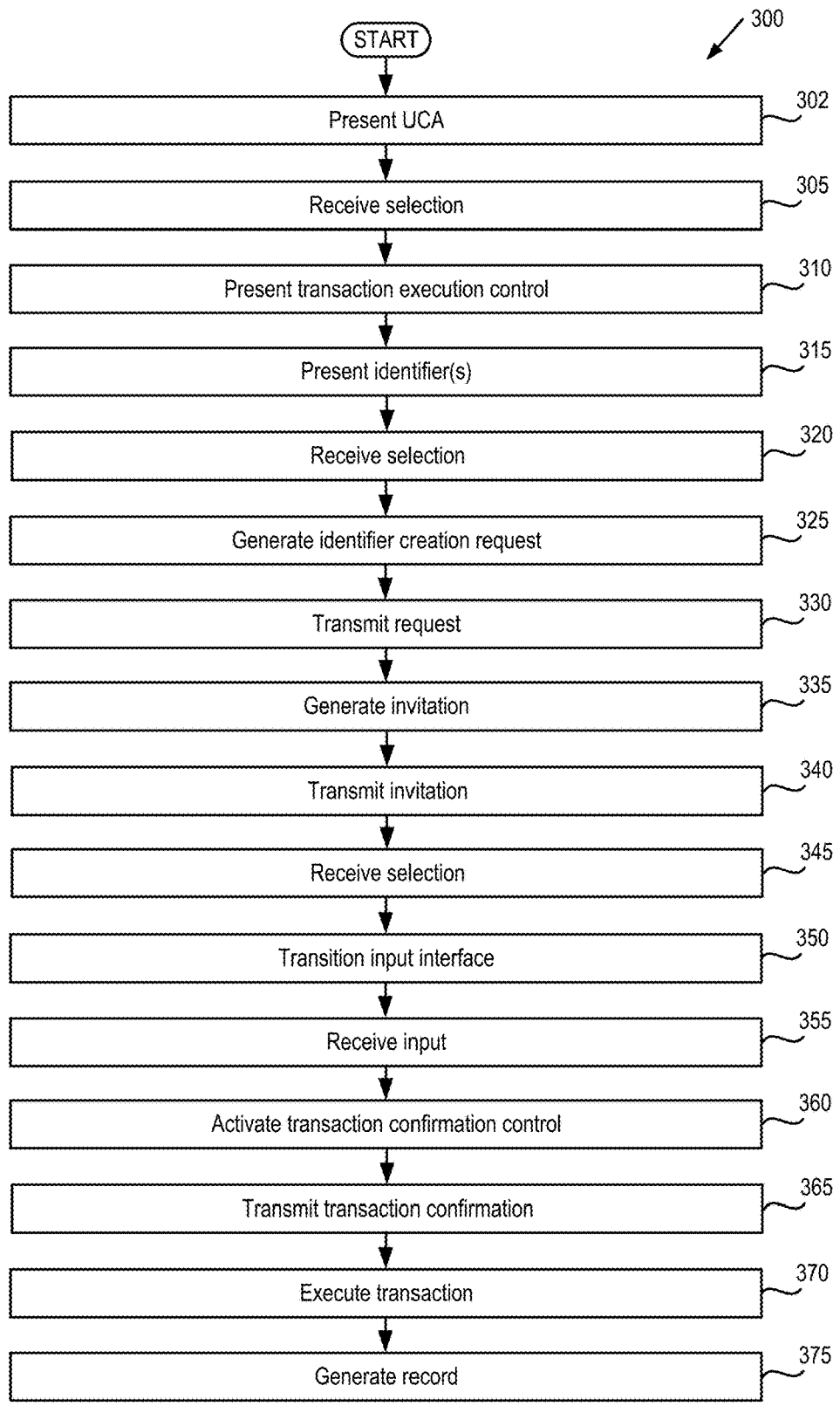
FIG. 3 depicts a flow diagram of aspects of a method for secure transaction interfaces and integrating secure transaction capabilities with user communication agents and mobile devices in accordance with various implementations of the present disclosure.

In certain implementations, various aspects of the described technologies can be implemented as methods, processes, etc., e.g., for providing secure transaction interfaces and/or integrating secure transaction capabilities with user communication agents and mobile devices. For example, FIG. 3 depicts a flow diagram of a method 300 for providing secure transaction interfaces. The method is performed by processing logic that may comprise hardware (circuitry, dedicated logic, etc.), software (such as is run on a computer system or a device such as those described herein), or a combination of both. In one implementation, the method is performed by one or more components depicted in FIGS. 1A-1D, while in some other implementations, one or more operations or blocks of FIG. 3 may be performed by another machine or machines.

For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Provided below is an exemplary scenario with respect to which the described technologies can be implemented to send money from user to user. In the scenario below, user A ('Arie') would like to send money to user B ('Alon') and both user A and user B have the app (and VK) installed on their respective mobile devices and have completed the on-boarding process.

At block 302, a user communication agent (UCA) can be presented. Such a UCA 120 can be, for example, a messaging/chat application, etc., such as may execute on a device 102, in order to enable users to correspond/communication with one another, as described herein. In certain implementations, such a UCA can be presented at a display interface (e.g., a touchscreen) of a device (e.g., a mobile device, smartphone, tablet, etc.). For example, FIG. 4A depicts an exemplary interface 400 which may be depicted, displayed, etc., at a display interface (e.g., display 610 as shown in FIG. 5, such as a touchscreen, LCD/LED screen, etc.) of a user device 102. As further shown in FIG. 4A, in certain implementations interface 400 (which, as noted, is presented, displayed, etc., at a display of a device 102) may be separated into various areas, sections, regions, etc. For example, one region/area of interface 400 can present/display the interface 401 of the UCA (e.g., the messages, etc., that make up a WhatsApp communication thread/session) in which user A and user B are engaged in a communication session. As also shown in FIG. 4A, other areas, sections, regions, etc. of interface 400 can present/display other interface(s), such as user input interface 402 (e.g., the keyboard/VK), as described herein.

At block 305, a selection can be received (e.g., via the device of user A). In certain implementations, such a selection can be received while the UCA is presented at the display interface of the device (e.g., while interface 401 of the UCA is presented on the touchscreen/display of device 102). Moreover, in certain implementations, such a selection can be a selection of a transaction initiation control (e.g., a specific key, button, control, etc., that, when selected, can enable/activate additional functionality within the keyboard, e.g., in order to facilitate/execute various secure transaction, as described herein). Moreover, in certain implementations such a selection of the referenced transaction initiation control can be received within a user input interface (e.g., a keyboard or other such interface that can be displayed and/or interacted with on a touchscreen device such as a smartphone or tablet). It should be noted that, as described herein, in certain implementations such a user input interface may execute on the device independently of the UCA executing on the device. That is, it can be appreciated that while the UCA (e.g., a messaging application) and the user input interface (e.g., the described keyboard/VK) may execute concurrently and/or be displayed at the same time, e.g., within a single user interface (e.g., as shown in interface 400 of FIG. 4A), in certain implementations UCA and the user input interface may execute independent of one another. In doing so, for example, inputs, etc., received within the user input interface may not be accessible by, perceptible to, received by, etc., the UCA (and/or may not be accessible, etc. by the UCA without authorization by the user). It can be appreciated that, in view of the independent execution of the user input interface, the various secure transaction operations and functionality described herein can be enabled even within, with respect to, and/or in conjunction with a UCA that otherwise may not have secure transaction capabilities).

By way of further illustration, it can be appreciated that initially, user A and user B may engage in a chat conversation in any chat messenger (Facebook messenger, WhatsApp, Wechat, Snapchat, Telegram, etc.). For example, FIG. 4A depicts an exemplary user interface 400 in which user A and user B are engaged in a communication session within UCA 401 (e.g., WhatsApp). User A may indicate (e.g., within the course of the communication session) that he would like to send money to user B via the keyboard. Then, user A can indicate that he wishes to initiate such a secure transaction, such as by selecting or otherwise activating a transaction initiation control 404 within a user input interface 402 (e.g., the keyboard/VK). The referenced user input interface can be, for example, a keyboard (e.g., as can be displayed and/or interacted with on a touchscreen device such as a smartphone or tablet), VK, and/or any other such interface (e.g., an interface for receiving/processing voice commands, gesture commands, etc.) through which inputs can be provided and/or received. Additionally, the referenced transaction initiation control 404 can be, for example, a key within the keyboard (e.g., the '$' key) that, when selected, can enable/activate additional functionality within the keyboard, e.g., in order to facilitate/execute various secure transaction, as described herein. By way of illustration, user A can press, select, etc. the '$' key (or any other such key, button, etc., designated for initiating secure transactions/payments), which may be located at the bottom of the keyboard (as shown in FIG. 4A—user A (Arie) can initiate a transaction with/payment to user B (Alon) by pressing the '$' key). Again, as noted above, it should be understood that while, in certain implementations, UCA 401 and user input interface 402 may be presented within respective regions, areas, etc. of a single user interface (e.g., interface 400 as shown in FIG. 4), UCA and the user input interface may execute independently of one another. Thus, while UCA may not be a secure communication platform, secure transactions can still be initiated and/or executed via the user input interface, as described herein. It should also be noted that, in other implementations, UCA and user input interface may share and/or transfer certain information, as described in greater detail herein.

Figure 4B:
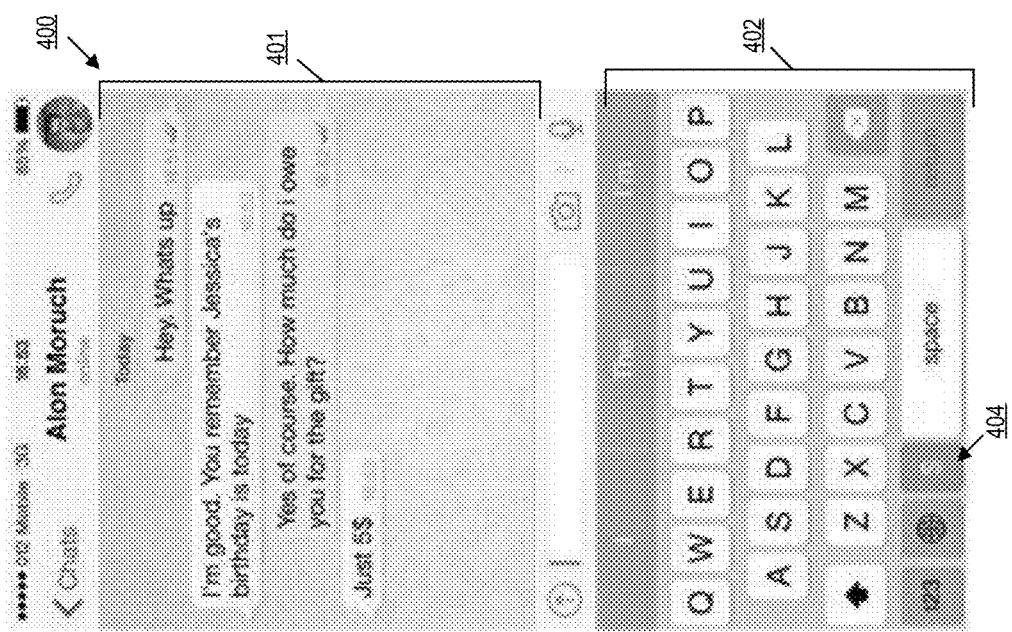
FIG. 4B depicts an exemplary user interface in accordance with one implementation of the present disclosure.
Figure 4A:
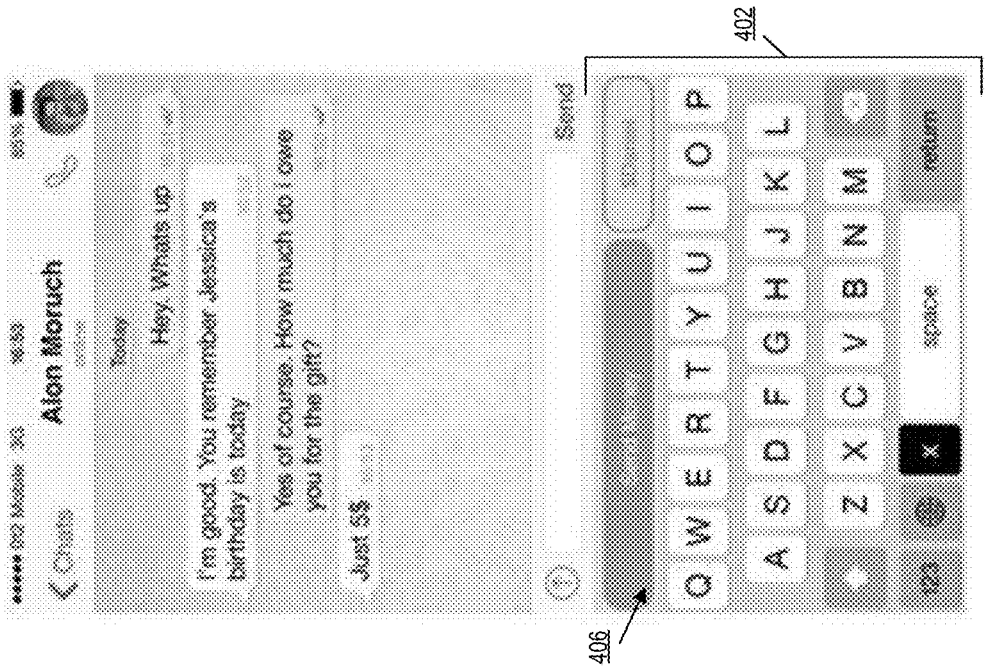
FIG. 4A depicts an exemplary user interface in accordance with one implementation of the present disclosure.

At block 310, a transaction execution control (e.g., a button, control, etc., indicating that the user wishes to execute a secure transaction, e.g., a 'Send Money' button as shown in FIG. 4B) can be presented (e.g. via the device of user A). In certain implementations, such a transaction execution control can be presented in response to the selection of the transaction initiation control (e.g., pressing the '$' key, as received at 305). Moreover, in certain implementations such a transaction execution control can be presented within/via the user input interface 402 (e.g., the referenced keyboard/VK).

By way of illustration, as has been noted, in certain implementations, by pressing, selecting, or otherwise activating transaction initiation control 404 (e.g., the '$' key), a transition in the keyboard (e.g., the UI of keyboard 402) can be initiated. For example, as shown in FIG. 4B, keyboard 402 can be configured (upon receipt of a selection of transaction initiation control 404) to display a transaction execution control 406 such as a selectable "Send Money" option/button. The user (here, user A) can then select (e.g., tap, press, etc.) the transaction execution control (here, the "Send Money" option).

At block 315, one or more identifiers can be presented. In certain implementations, such identifiers can be presented via an identifier selection control (e.g., a button, drop down menu/list, etc., through which the recipient of the transaction can be input or selected, as described herein). Moreover, in certain implementations such identifiers can be presented in response to a selection of the transaction execution control (e.g., as received at 310).

Figure 4D:
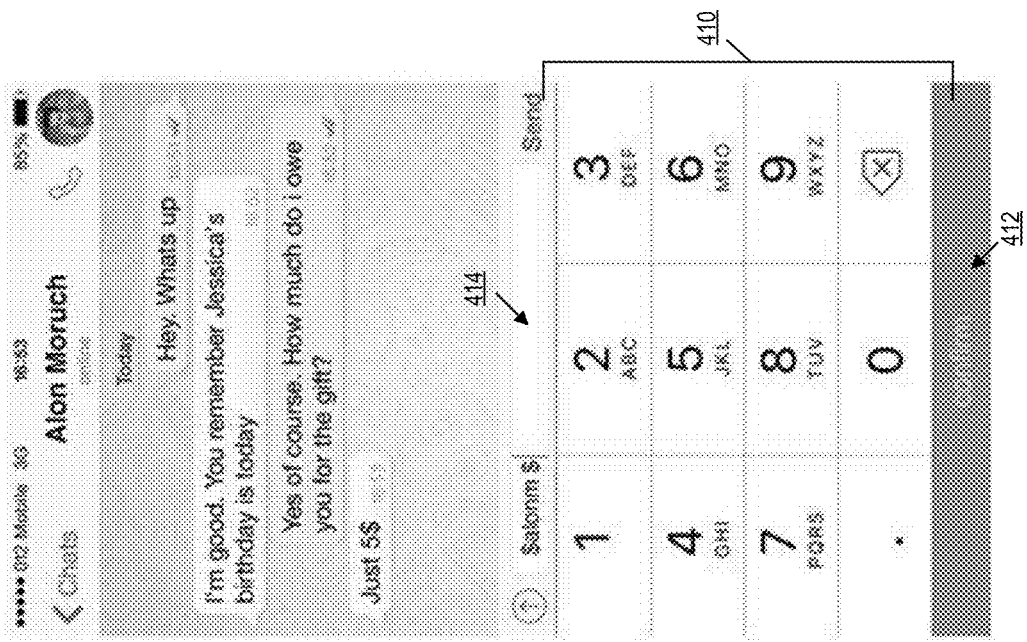
FIG. 4D depicts an exemplary user interface in accordance with one implementation of the present disclosure.
Figure 4C:
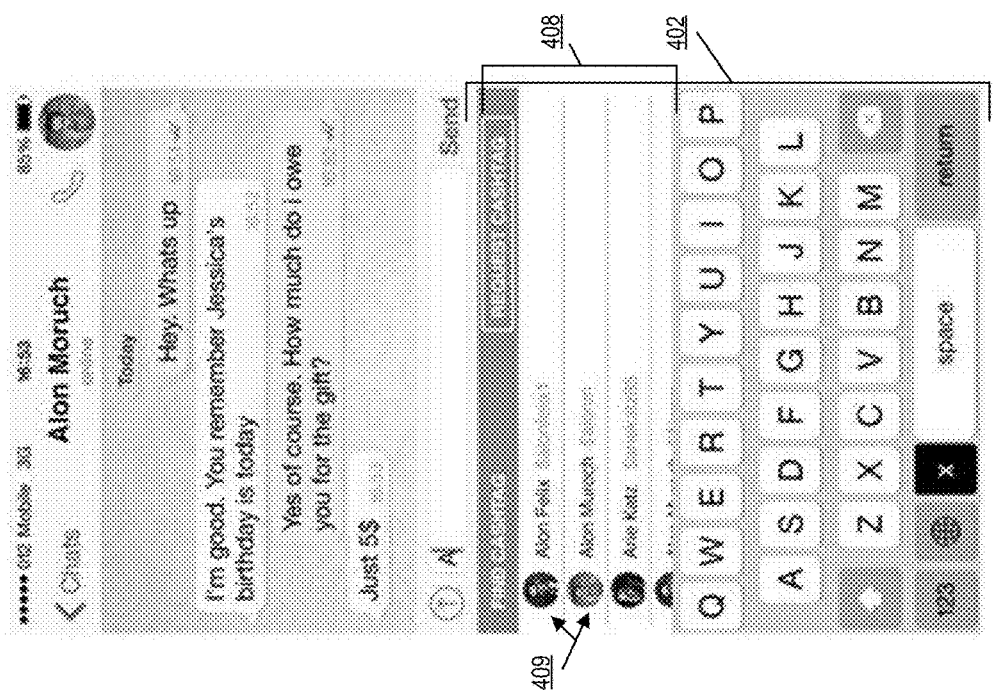
FIG. 4C depicts an exemplary user interface in accordance with one implementation of the present disclosure.

By way of illustration FIG. 4C depicts an identifier selection control 408 (e.g., a button, drop down menu/list, etc., through which the recipient of the transaction can be input or selected, as described herein) which can be presented (e.g., within the interface of the keyboard 402). User A can then select an identifier associated with user B, e.g., from an identifier selection control (e.g., a button, drop down menu/list, etc.). For example, in certain implementations, a drop down list of available identifiers 409 (as generated, for example, based on user A's contacts list, transaction history, recent contacts, etc.) can be generated and displayed (e.g., as depicted in FIG. 4C).

At block 345, a selection can be received. In certain implementations, such a selection can be of one (or more) of the identifiers presented via the identifier selection control (e.g., at 315). For example, User A can select the relevant identifier (either by selecting the relevant identifier from the referenced list or by requesting an identifier from user B). In certain implementations the identifier can be formatted as: "$username" (e.g. @alonm) (see below for the process for requesting an identifier from user B scenario). User A can then selects an identifier (e.g. from the list), or copies an identifier sent by user B (e.g., as described below). Additionally, in certain implementations the selected identifier(s) can be mapped to a secure transaction account, as described in detail below.

At block 350, the user input interface (e.g., the keyboard/VK as displayed on user A's device) can transition into a numeric input interface (e.g., a keypad). In certain implementations, such a transition can be initiated in response to the selection one (or more) identifiers (e.g., as received at block 345). By way of illustration, upon receiving a selection of the identifier(s), the interface of keyboard 402 can then transition into a numeric keypad 410, as shown in FIG. 4D. In certain implementations, a transaction confirmation control 412 (e.g., a "Confirm" button, option, etc.) can be displayed, e.g., at the bottom of the keypad (such a control may be inactive—e.g., 'greyed out' until a numerical value has been input via keypad 410, as shown in FIG. 4D). The following sentence/format can also appear in the message input interface 414 (e.g., the chat line): "$username $" (e.g., as shown in FIG. 4D—The text is inserted inline and the numeric keypad appears).

It should be understood that, as referenced above, in certain implementations various aspects of the forgoing description pertain to scenario(s) in which user A selects user B's identifier from a drop list, or copies it manually. However, as also noted above (e.g., with respect to receiving incoming information/messages into the app), user A's VK may be configured to detect/determine that user A is communicating (e.g., with a messaging application) with user B, and based on such a determination, may automatically select user B's UPID (assuming he already has one), or copy it from the UCA UI—e.g., without requiring user A to manually select or copy it. Alternatively, and as noted above (e.g., with respect to VK-to-VK (P2P) communication), when user B installs the app after a "request UPID" invite, user B's app may be configured to send user A's app a copy of its newly created (user B) UPID via the P2P link. Thus, in such scenarios user A will not have to manually copy it.

At block 355, a numeric input can be received. In certain implementations, such a numeric input can be received via the numeric input interface (e.g., the interface presented at block 350). By way of illustration, User A can input, type, etc. (e.g., via keypad 410) the amount of money he would like to send to user B. In doing so, the complete chat/message line 414 can read: '[$username] [$amount of money]'.

Figure 4F:
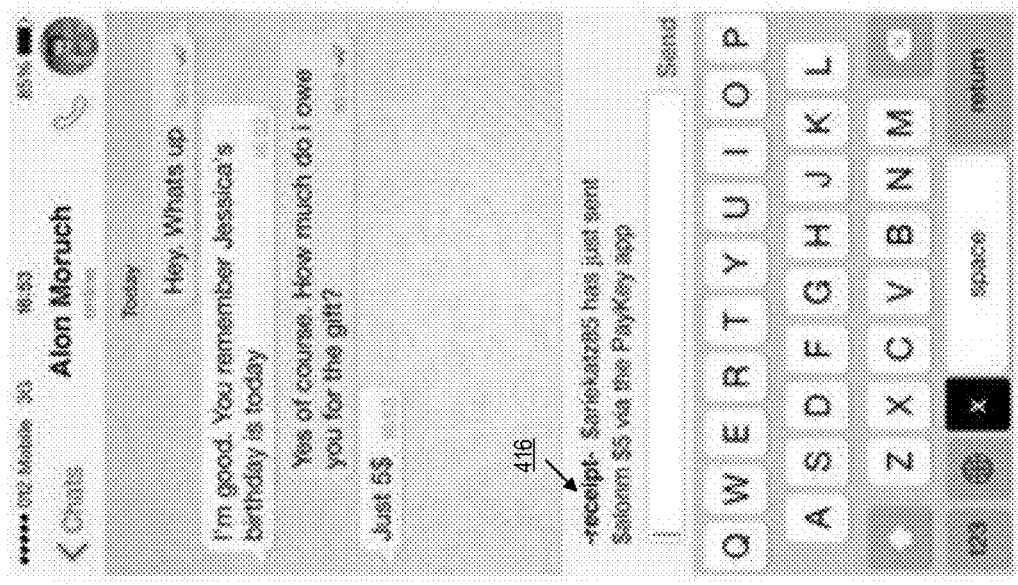
FIG. 4F depicts an exemplary user interface in accordance with one implementation of the present disclosure.
Figure 4E:
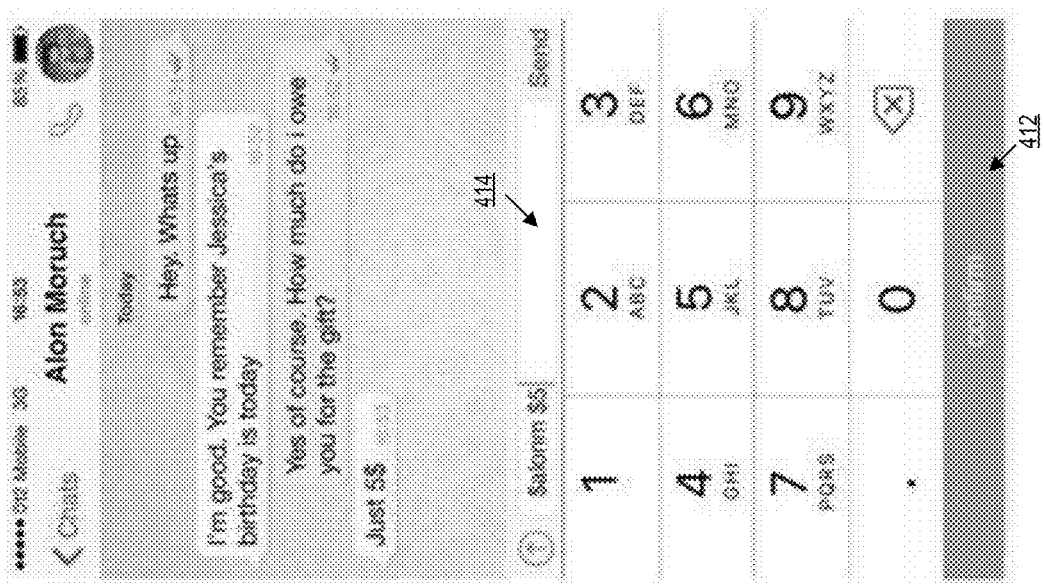
FIG. 4E depicts an exemplary user interface in accordance with one implementation of the present disclosure.

At block 360, a transaction confirmation control (e.g., a control, button, etc., that confirms the amount associated with a secure transaction) can be activated or enabled. In certain implementations, such a control can be activated in response to receipt of the numeric input (e.g., at block 355). Moreover, in certain implementations such a control can be activated within the user input interface (e.g., the keyboard/VK). By way of illustration, as shown in FIG. 4E, once the number is typed/input into the keypad, transaction confirmation control 412 (e.g., the "Confirm" button) can be activated (e.g., turns green), indicating to the user that he needs to press the "Confirm" button for the transaction to complete (e.g., as depicted in FIG. 4E—user A types '5,' into message input interface 414 as the amount he'd like to send to user B).

At block 370, a secure transaction can be executed. In certain implementations, such a transaction can be executed in response to a selection of the transaction confirmation control (e.g., as activated at block 360). Moreover, in certain implementations, such a transaction can be executed with respect to the respective identifier(s) (e.g., those of user A and user B) and the numeric input (e.g., as received at block 355). By way of illustration, user A can select (e.g., tap, press, etc.) transaction confirmation control 412 (e.g., the "Confirm" button). In doing so, the transaction can be finalized and the funds, etc., associated with the transaction can be sent (e.g., as described herein).

At block 375, a transaction confirmation record (e.g., a receipt of the transaction) can be generated. By way of illustration, as shown in FIG. 4F, pressing the "Confirm" button can cause the display of a transaction confirmation record 416 such as a receipt that describes the transaction (and user A may optionally send such a receipt to user B). The receipt can include the following "$userAidentifier has just sent $userBidentifier $the amount of money via the PayKey app" (see FIG. 4F—user A pressed the "Confirm" and the receipt appears in the chat line). For example, FIG. 4G depicts an exemplary scenario in which the secure transaction is complete and user A has pressed the "Send" button to send the receipt as a message to user B.

It should be understood that, as noted above, various aspects of the described processes may be implemented in scenarios in which only one of the parties to a transaction (e.g., user A) has the keyboard installed. For example, at block 320 a selection of an identifier request control 418 (e.g., a control, button, option, etc., through which user A can request that user B provide his/her identifier to user A) can be received. By way of illustration, in the scenario outlined above, upon determining that user B's identifier is not present in the drop down list, user A can select an identifier request control 418 from within user input interface 402 (e.g., the keyboard/VK) (e.g., the "Request . . . " button/option as shown in FIG. 4H—The 'request identifier' option 418 appears above the drop down list).

Upon selecting (e.g., tapping) the "Request . . . " option, at block 325 an identifier creation request can be generated. At block 330, such an identifier creation request can be transmitted to one or more users. For example, user B can be sent a message, notification, alert, etc. requesting that he create or activate an identifier. User B can then install the app, fill in his details via the app's on-boarding and selects an identifier. User B's generated identifier can then be sent to user A, and the process can continue as described above.

An additional exemplary scenario pertains to sending money from user to user. In the scenario described below, user A would like to send money to user B. In this scenario, user A may have the app (and VK) installed on his mobile device(s) and may have completed the on-boarding process (such that his payment method, bank account, credit/debit card/wallet, etc. is associated with or otherwise accessible to the app and/or to the VK).

As noted, user A would like to send money to user B via the keyboard. For example, user A and user B may be engaged in a communication session/conversation, such as in a messaging application (e.g., Facebook messenger, WhatsApp, Wechat, Snapchat, Telegram, etc.). It should be further understood that, in certain implementations, the engagement between the parties may be initiated in a group chat and/or via practically any other communication method (e.g., SMS, email, call) and/or in a real life (e.g., face-to-face) encounter. In addition, user A may initiate the sending on its own (that is, without any interaction, e.g., physical or virtual, with user B). For example, user A presses or otherwise selects a transaction initiation control 404 within a keyboard 402 (e.g., the '$' sign, which may be, for example, located at the bottom of the keyboard, e.g., as shown in FIG. 4A). In certain implementations, selecting the '$' sign can change the layout or interface of keyboard 402 such that it enables user A to "search for a Contact," as described herein.

User A can then select an identifier 409, which may correspond to a contact associated with user B. In certain implementations, such an identifier 409 can be selected from an identifier selection control 408 (e.g., a button, drop down menu/list of contacts, etc., through which the recipient of the transaction can be input or selected, as described herein) can be presented by the VK (e.g., as shown in FIG. 4C). The list of contacts can, for example, be generated from the device contacts, from a list provided by the app, from a list provided by a backend service such as the BES and TES and/or from other sources. User A can then select an identifier 409 (which, as noted, may correspond to a contact entry) from the list, e.g., as described herein. If the desired entry is not present in the list, user A may provide contact information manually (and the existence of such an ID can then be verified).

The keypad can transition into a numeric keypad 410, e.g., as shown in FIG. 4D and described herein. user A can input the amount of money he would like to send to user B (e.g., as shown in FIG. 4E and described herein). The VK may perform validation checks on the numeric input (e.g., to make sure the entered number conforms to various business logic rules). Once the number is typed and validated, a transaction confirmation control 412 (e.g., a 'confirm' button, option, etc.) may be displayed and/or activated for selection (e.g., within the keyboard, VK, etc., interface, as shown in FIG. 4E and described herein), through which the user can confirm that the transaction is to be completed. User A can then select the "Confirm" option. Upon receipt of such a selection, the transaction information collection can be finalized.

In certain implementations, the transaction initiator (that is, the user transferring funds) can then be prompted to authenticate his/her identity (upon authentication of which, in certain implementations, the transaction can be executed/completed). This can be done, for example, by providing a PIN code, using a touch/biometric sensor (e.g., touch ID), providing user ID/password and/or using any other such authentication mechanism. The inputs provided can be used, for example, by the VK, the app, and/or the backend component, to verify the identity of the transaction initiator (e.g., the user transferring funds).

The collected information can then be used to perform/execute the payment transaction. The transaction can be performed locally (e.g., on the device) and/or by a backend component. In certain implementations, the transaction may be completed based on certain information. For example, in certain implementations the transaction may be completed/executed based on the authenticated sender payment method data (e.g., as collected during the on-boarding stage or received subsequently from the payer, as described herein). Additionally, in certain implementations the transaction may be completed/executed based on an amount to be transferred (e.g., as received via the numeric keypad 410 as described herein). Moreover, in certain implementations the transaction may be completed/executed based on the identifier 409 of the payee (here, user B)—which may be received by the VK, app, or backend from the contact entry, e.g., as selected by the user via identifier selection control 408, as described above.

As referenced above, in scenarios in which the selected identifier (e.g., of user B) can be mapped to a secure transaction account such as a known/verified payment source, method, account, etc. (e.g., based on information previously received), the referenced secure transaction/transfer can be initiated. Such a transfer can be initiated from the VK, the app, and/or from the backend component.

It should be understood that, in certain scenarios the transfer may fail for various reasons (e.g., if there are no funds to transfer, authentication problems, etc.). At block 335, an enrollment invitation can be generated, e.g., in response to a failure of the mapping of the selected identifier(s) to a secure transaction account. At block 340, the enrollment invitation (as generated at block 335) can be transmitted to the selected identifier(s) (e.g., to a user corresponding to such identifier(s)). For example, in cases of such failures, an error notification, alert, etc. can be presented to the payer (here, user A). If the transaction/transfer is successful, the VK can generate and/or provide a transaction confirmation record 416, such as a receipt or confirmation message. Such a transaction confirmation record 416 can be provided by user A to the UCA and can be transmitted, shared, etc. with other users (e.g., those with whom the payer is currently communicating). In addition, in certain implementations the described technologies may generate/provide a transaction confirmation record 416, informing both users (A and B) regarding the successful transfer (e.g., by SMS, email, or any other notification, message, etc.).

It can be appreciated that, in scenarios in which the identifier of user B cannot be mapped to a secure transaction account such as a known/verified payment source, method, account, etc. (e.g., based on previously received/collected information), user A can be notified. For example, a notification can be provided (e.g., via the VK) to user A (here, the payer), suggesting that the user invite user B, e.g., by sending him an invitation message (e.g., via chat, email, SMS, etc.), to download the app, register, enroll, etc., an account, etc. (in order to utilize the described technologies). Such an invited user can then identify/verify his/her identity (e.g., via email, phone number, etc.) and provide his secure transaction/payment account(s), method(s), etc.

In another exemplary scenario, the described technologies can be employed to enable secure transactions such as the sending/transfer of funds from user to user. In the scenario outlined below, user A would like to send money to user B. In this scenario, user A may have the described app (and VK) installed on his mobile device(s) and may have completed an on-boarding process (such that, for example, his payment method, bank account, credit/debit card/wallet, etc. is associated with or otherwise accessible to the app and/or to the VK).

For example, user A and user B may be engaged in a communication session/conversation, such as in a messaging application (e.g., Facebook messenger, WhatsApp, Wechat, Snapchat, Telegram, etc.), as described herein. It should be further understood that, in certain implementations, such a transaction can be initiated within a communication interface/application (e.g., chat, SMS, email, call, etc.) and/or in a real life (e.g., face-to-face) encounter. In addition, in certain implementations user A may initiate the transaction/transfer on its own (that is, without prior interaction, e.g., physical or virtual, with user B).

User A can then select or otherwise activate a transaction initiation control 404 (e.g., within a user input interface 402), such as by pressing or otherwise selecting the designated control/button (e.g., the '$' key) which may be, for example, located at the bottom of the keyboard (e.g., as shown in FIG. 4A and described herein).

As noted, in certain implementations, by pressing, selecting, or otherwise activating transaction initiation control 404 (e.g., the '$' key) a transition, adjustment, and/or modification to the keyboard (e.g., the layout, UI, etc. of keyboard 402) can be initiated. Such a transition can, for example, enable user A to utilize an identifier selection control 408 (e.g., a button, drop down menu/list, etc.) to, for example, "search for a Contact." In certain implementations this step may be optional such that, for example, user B's identifier may be entered by default (and thus user A would not need to search user B as a contact).

The interface of keyboard 402 can then transition into a numeric keypad 410 (e.g., as shown in FIG. 4D and described herein). User A can input (e.g., via keypad 410) the amount of money, value, credit, etc. he would like to send to user B (e.g., as shown in FIG. 4E and described herein). The VK may perform validation check(s) on the number (e.g., to make sure the entered number conforms to various business logic rules). Once the number is typed and validated, a transaction confirmation control 412 (e.g., a "confirm" button, option, etc.) may be displayed, through which the user can confirm that the transaction is to be executed. User A can then select transaction confirmation control 412 (e.g., the "Confirm" option/button). Upon receipt of such a selection, the transaction information collection can be finalized, as described herein.

In certain implementations, the transaction initiator (that is, the user transferring funds) can be prompted to authenticate him/herself. This can be done, for example, by providing a PIN code, using a touch/biometric sensor (e.g., touch ID), providing user ID/password and/or using any other such authentication mechanism. The inputs provided can be used, for example, by the VK, the app, and/or the backend component, to verify the identity of the transaction initiator (e.g., the user transferring funds), e.g., in a manner described herein.

The collected information (payer information, authentication data, amount, and optionally the contact information) can then be provided/transmitted to a machine or service such as an external machine (e.g., the backend component (BES)). The BES 150 can store the information and, in return, can generate and/or provide to user A transaction confirmation content which can be, for example, a link or hyperlink (or any other such content element, e.g., an image, etc., as described herein) which includes a code that represents or corresponds to the information which was stored by the backend (and/or corresponds to the secure transaction). At block 365, the transaction confirmation content can be transmitted, e.g., to a user associated with the selected identifier(s). For example, the generated/received content/link can be transmitted/shared with/provided to user B, e.g., via the referenced chat, SMS, email, application and/or via any other means.

Once user B clicks on or otherwise selects/activates the referenced transaction confirmation content (e.g., link), he can be presented with a screen/interface (e.g., a webpage, application interface, etc.) within which he can confirm his acceptance of the payment corresponding to the referenced transaction. In some implementations user B can provide his receiving method information which reflects the receiving method (e.g., bank account, credit/debit card/electronic wallet, etc.) to which the payment sent by user A should be made. In some implementations this information can be stored on the user's device to enable the user to quickly reuse it with respect to subsequent transactions.

As noted, the code which is part of the referenced content/link, the user confirmation, and the information provided by the receiving user can be provided to the BES. The BES can aggregate the referenced inputs using the code the information provided by user A and user B. The collected information from user A and user B can then be used to execute/reconcile the payment transaction.

In another exemplary scenario, the described technologies can be configured to enable secure transactions (e.g., sending money) from user to user. In the scenario outlined below, user A requests money from user B and user B transfers the payment to user A. In this scenario, user A may have the app (and VK) installed on his mobile device(s).

For example, user A and user B may be engaged in a communication session/conversation, such as in a messaging application (e.g., Facebook messenger, WhatsApp, Wechat, Snapchat, Telegram, etc.), as described herein. It should be further understood that, in certain implementations, such a transaction can be initiated within a communication application (e.g., chat, SMS, email, call, etc.) and/or in a real life (e.g., face-to-face) encounter. In addition, in certain implementations user A may initiate the transaction/transfer on its own (that is, without prior interaction, e.g., physical or virtual, with user B).

User A can then select or otherwise activate a transaction initiation control 404 (e.g., within a user input interface 402), such as by pressing or otherwise selecting the designated control/button (e.g., the '$' key) which may be, for example, located at the bottom of the keyboard (e.g., as shown in FIG. 4A and described herein).

As noted, in certain implementations, by pressing, selecting, or otherwise activating transaction initiation control 404 (e.g., the '$' key) a transition, adjustment, and/or modification to the keyboard (e.g., the layout, UI, etc. of keyboard 402) can be initiated. Such a transition can, for example, enable user A to utilize an identifier selection control 408 (e.g., a button, drop down menu/list, etc.) to, for example, "search for a Contact." In certain implementation this step may be optional such that, for example, user B's identifier may be entered by default (and thus user A would not need to search user B as a contact).

The interface of keyboard 402 can then transition into a numeric keypad 410 (e.g., as shown in FIG. 4D and described herein). User A can input (e.g., via keypad 410) the amount of money, value, credit, etc. he would like to receive from user B. The VK may perform validation checks on the number (e.g., to determine that the entered number conforms to various business logic rules). Once the number is typed and validated, a transaction confirmation control 412 (e.g., a "confirm" button, option, etc.) may be displayed, through which the user can confirm that the request should proceed. User A can select the transaction confirmation control 412 (e.g., the "Confirm" option/button). Upon receipt of such a selection, the request can be finalized.

The referenced collected information (e.g., the identifiers of the respective users, numeric input, etc.) can then be encapsulated and/or otherwise used to generate transaction request content, such as a link or hyperlink (or any other such content element, e.g., an image, etc., as described herein) that can be shared with/transmitted to user B, e.g., via chat, SMS, email, etc., applications, and/or via any other mean. It should be understood that such transaction request content can, for example, include code that represents or corresponds to the information referenced above which makes up the transaction/payment request (e.g., identifier(s), amount, etc.).

Once user B clicks on or otherwise selects/activates the referenced transaction request content (e.g., link), he can be presented with a screen/interface (e.g., webpage, application interface, etc.) where he can confirm the payment and execute it. In some implementations user B may be prompted to provide his payment method information which reflects the payment method (e.g., bank account, credit/debit card/wallet, etc.) from which the payment should be made. In some implementations this information can be stored on the user's device such that if can be reused for subsequent transactions. Additionally, in certain implementations in lieu of use the referenced transaction request content/link for the actual payment, the payer (user B) can use various techniques such as those described above and/or herein in order to complete the payment/execute the transaction. For example, a transaction confirmation can be received with respect to the referenced transaction request content and the secure transaction can be executed in response to the received transaction confirmation.

It should be understood that various processes described and/or referenced herein can incorporate additional operations including but not limited to: sender authentication, payee identification, amount selection, request verification, money transfer. It should be noted that, in certain implementations, certain operations may be performed in a different order and that some operations (e.g., verification) may be embedded within other steps. For example, payee identification can be performed immediately when the contact is selected.

Figure 1D:
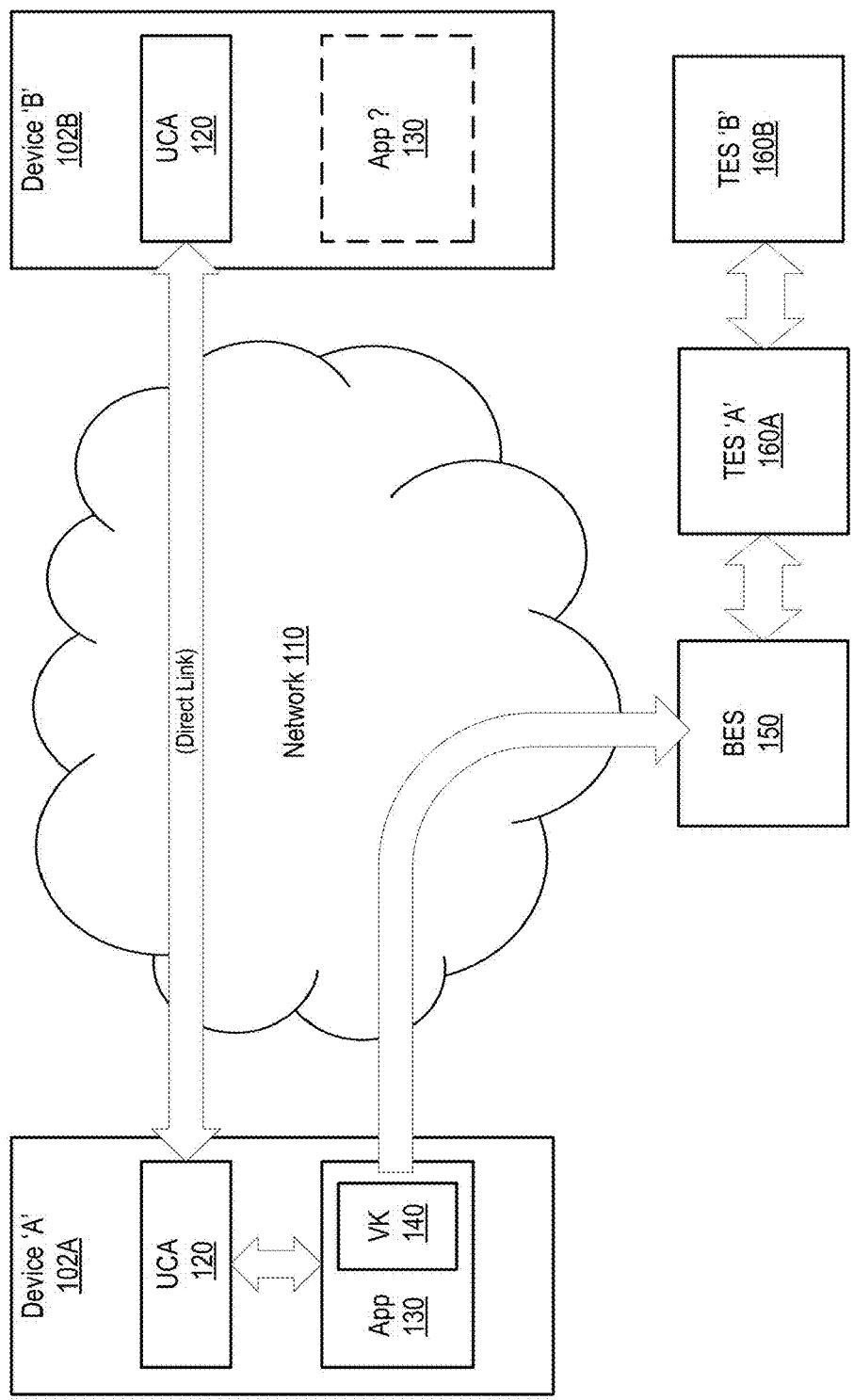
FIG. 1D depicts an illustrative system architecture, in accordance with one implementation of the present disclosure.

An exemplary architecture for this scenario is illustrated in FIG. 1D. With respect to FIG. 1D, it should be noted that: device B may or may not have the app (and VK) installed. Thus, a peer-to-peer link may not be implemented. User A and user B may each have their own TES—TES-A 160A and TES-B 160B (or may be using the same TES). For example, both users may be using the same bank or may be using two different banks connected to a common bank transfer exchange via other money transfer mechanism. However, it should be understood that in that user A can interact with the payment app (e.g., through the VK) in a parallel with the UCA and while maintaining his context in the UCA.

The described technologies can also be implemented to enable payment and/or e-commerce capabilities in various settings. For example, the app/VK may have access to the user's credit card information. Thus, the VK may also be used with regular e-commerce web sites, including those which are not connected to the described technologies' payment system. This can be done by having specific keys in the VK which will insert the credit card or other relevant details (e.g. payer name, phone, address and the credit card type, number and expiration date).

In other implementations, the described technologies can be used for temporary credit card generation: For example, the described technologies may provide the user with the ability to generate a temporary credit card to be used for this single transaction. The described technologies (e.g., via user interaction with the VK) can create a pre-paid virtual credit card which only has sufficient money for this specific transaction. The temporary credit card may be loaded with cash from the system's wallet, from the user's regular credit card and/or the user bank account (as selected by the user). Such an arrangement is far more secure than the use of the user's regular (permanent) credit card. Since the VK has generated this temporary credit card, its details are available in the VK and could be inserted using special keys. Thus, the user would not have to manage the details of this temporary credit card.

The described technologies can also be implemented to enable transactions associated with physical goods. For example, the described technologies may support a virtual representation of physical goods' values. An example would be an image representing a transfer a value (e.g. a beer glass picture representing an amount of X$ which is the typical value of the beer). The described technologies may also include a number of predefined emojis (accessible, for example, via a built-in emoji keyboard) to represent various objects and values (e.g. a $3 beer, a $10 meal etc.). Emojis in particular can be easily combined into text messages to be sent via a chat program (e.g. "Hi Joe, this <beer-emoji> is on me"). Sending such a message would enable the recipient to reclaim the amount.

In other implementations, the described technologies can be employed with respect to redeemable digital goods: For example, the described technologies may also support gift cards which may be redeemable for digital goods consumable on the recipient's mobile device. Examples include mobile app-store gift card, digital books, music media and subscriptions. In this case the described technologies may directly interface with the relevant digital content supplier (app store, digital music provider etc.) to provide the downloading and payment interfaces.

In other implementations, the described technologies can be employed with respect to a continuous session billing: The described technologies may support conducting a communication session and billing (in real time) according to the length of session (e.g. using a 1-minute increment). This can be done using video or voice calls through a relevant UCA. The payer is paying in real time and both sides can stop the session at any time. The payment can be conducted through the P2P link described above, so not to interfere with the UCA communication. This may include (for example) private lessons, doctor session, legal session etc.

The described technologies can also be implemented to enable advertising, promotion, and/or content delivery. For example, the VK can be used as an advertising area by itself. The VK may only be invoked at specific times, but (when invoked) is can occupy considerable screen real estate—in some case well over half of the screen (e.g., on a mobile device). Thus, the described technologies may use part of this screen real estate as a possible advertising area. Such areas can be sold or auctioned to various advertisers, e.g. using a real-time market, etc. One advantage of VK-based advertising is that the VK often has substantial context information about the user's current interests. Accordingly, the described technologies can analyze such context so as to optimize the displayed advertising using various optimization techniques.

In various implementations, the referenced context can be determined based on: An analysis of the user's current and previous text conversation in the associated UCA(s). For example, if the user is talking about house cleaning, a robotic vacuum cleaner advertisement may be highly relevant. If the user says "happy birthday", a birthday present offer may be relevant. Environmental information such as date & time (e.g. offering valentine good on valentine day), geographic location (as determined based on inputs originating from a GPS receiver of the device), country, etc. On-going analysis of the user's activity—including in particular previous purchases, advertisement clicking/response, and/or other interactions.

The described technologies can also be implemented to create an encryption/communication hiding layer above an existing UCA (which may be encrypted or not). Encrypted chat is performed by configuring the VK to take a typed plaintext message, encrypt it and send the encrypted version through the UCA instead. On the receiving side, the VK may receive the encrypted message (manually or automatically as described above) and perform the decryption.

In other implementations, the described technologies can be employed to transfer a hidden message—e.g., by inserting a typed message into a picture (e.g. from album or camera) and sending the picture via the UCA. A person who is eavesdropping or retrieving the UCA communication record may fail to identify that a secret message was transferred—in particular if combining encryption and stenography. Furthermore, the described technologies can be configured to enable such encrypted and/or hidden text to be transferred via the P2P link, making it even more difficult to intercept the message.

In other implementations, the described technologies can be configured to enable payment requirements in order to decode and other message conditions: In addition, the described technologies may provide a "pay to decode" capability—in which a message is encrypted and/or hidden, and a price is set for its opening. The described technologies would only enable a receiver to decode the message upon payment.

In other implementations, the described technologies can be configured to enforce various transaction conditions (e.g., those described above) for payment, e.g. "this message may only be opened during the next 3 days by an iPhone 6 device located in London and after paying $10". A message can also be locked to a specific user—adding the benefit of any authorization mechanism associated with the user ID being used in the verification process (such as a built-in smartphone fingerprint reader). In certain implementations the message can also be configured to 'self-destruct' (e.g., in 5 seconds). In other implementations, the described technologies can be configured to present an alternate, partial or otherwise obscured version of the message so to provide some indication of the messages content to the recipient.

In order to ensure the security of the referenced communications and/or transactions, the described technologies can include various security mechanisms, so as to prevent a person which steals the mobile device on which it is installed from using the app and transferring money. One such mechanism can lock the VK's privileged actions (like sending money) with a PIN. The keyboard would provide two configurations—a locked configuration (without the privileged actions) and an unlocked configuration (with the privileged actions). When the device is turned-on or initialized, or upon the passage of sufficient time, the keyboard can display the locked configuration. The user would have to type the PIN using the keyboard itself, which will than change into the unlocked configuration. In locked configuration the PIN keys can be virtual keys on the keyboard. This can be more secure than a PIN typed on a standard keyboard because the described technique can protect from a malicious keyboard 'sniffer' running on the described technologies (and listening to the regular keyboard). The strokes will not be registered as actual keyboard strokes.

The described technologies can also change the location and order of the PIN keys from session to session, so even 'sniffing' the tap locations will not really help. This may be integrated with additional techniques, such as those based on pattern unlock, signing with the finger, using other biometric verification methods (such as built-in fingerprint reader), etc.

Though the described technologies have been illustrated largely in the context of the use of a virtual keyboard in conjunction with UCAs such as an instant messenger/chat program on a mobile device, it should be understood that many additional embodiments are also contemplated.

First, and as noted above, the described technologies may be in used in conjunction with any type of user communication agent, including SMS, conferencing system, social network, e-mail, file transfer protocol, specialized communication client, or any other such communication method. Furthermore, the described technologies are not limited to Internet based implementations, and can also be used (for example) on cellular networks, land-line phone networks, LANs, WANs, private networks and point-to-point communication systems, etc.

Furthermore, the described technologies may be configured for use on various device, including mobile and non-mobile devices, as various desktop GUI system support virtual or software keyboards, or otherwise support alternative input methods.

Furthermore, in certain implementations the described technologies have been described as an added software component to existing systems. However, the described technologies may also be implemented as part of an alternative hardware keyboard which may include some configurable keys (e.g. whose display surface may be altered).

The described technologies may also be used with respect to Business to Person (B2P) interactions/transactions, such as the interactions with a potential or actual client. User interaction with businesses while using the described technologies can occur in a number of ways, including but not limited to: Remote interaction—interaction through the Internet with businesses having an on-line presence. Such on-line presence may include web-sites, as well as presence on social networks or messaging services. On-premises interaction—interaction via the described technologies when the person is present in the business' physical premises. Near-premises interaction—interaction via the described technologies when the user is near one or more businesses, e.g., when trying to locate relevant businesses. Such uses may include, for example, business discovery (e.g., which businesses are available), product browsing and ordering, checkout/payment related options and additional related functions (e.g., vouchers, gift card, coupons).

Some of these uses may require the business to actively connect to the described technologies in some way (e.g. registering with an operator or creating an interface between the business systems and various elements of described technologies). Other uses integrate with the existing ways in which businesses operate, e.g., using the described technologies together with existing business systems (on-line or off-line), even without modification to existing system(s) or specialized external interface(s).

In some scenarios, a group of people can utilize the described technologies in a group transaction with respect to the business' services or products. For example, a group of people going to a restaurant together for a shared meal (an on-site use case), or purchasing a product together from a website (e.g. purchasing a vacation deal or a birthday present). The described technologies may also provide specific further functionality to support such scenarios, known as Business to Group (B2G) scenarios.

In certain implementations, the described technologies can also be integrated with a call center/business chat back-end system: For example, when a person interacts with a business through an instant messaging system (e.g. through a chat system embedded into the business web site), and the interaction spans multiple conversations, the person may be talking with multiple representatives of the business (e.g. multiple business call center representatives).

The described technologies may be integrated with the back-end of such embedded chat system, and in such a case may provide user context (even though the actual conversation may be carried out with different call center representative). Such context may include (for example) previous payment and purchase history, outstanding vouchers etc. As noted below, some of the information may be related to multiple businesses (merchants)—such as "this user is a platinum-level food purchaser" (and would thus not be in the specific merchant databases). In this case, the described technologies may handle these multiple call center representatives of a single business as a single business user (e.g., for authentication purposes). For example, these multiple call center representatives may be able to utilize a common cash ID (e.g. $MyCoffeeShop) between them.

In certain implementations, the described technologies can be used without a virtual keyboard. For example, being that businesses often communicate via a connected PC (or multiple PC's) (rather than smartphones), the described technologies, when used by a business, can provide the described functionality via a desktop virtual keyboard, or a separate non-keyboard application installed on the desktop machine. Such technologies may be used in conjunction with browser-based application, or be a separate system (e.g., using the facilities provided by the operating system).

Additionally, as noted above, the described technologies may store transaction attributes and conditions for each transaction ID provided (e.g., a party's ID's and claiming conditions). When handling business users, the described technologies may store additional transaction information, including details of the order, purchased goods and bill associated with the transaction ID. Such information may include the actual details above, and may also include per-merchant ID's connecting the transaction ID to specific merchant back-end databases.

The described technologies may detect online businesses which can be relevant to the user using a number of techniques, including but not limited to: Based on external repositories or directories of business (e.g., those available for open access or through commercial providers such as OpenTable.com), using a database of businesses registered with the described technologies, and/or through analysis of content viewed by the user (e.g., web content, displayed social network posts (e.g. in Facebook or Twitter) or other sources).

Analysis of instant messaging activity—since the virtual keyboard has access to various user inputs (and possibly outputs as mentioned above), the virtual keyboard may analyze them to detect references or descriptions of businesses. The VK may accumulate references to businesses in such conversations, analyze them (using text analysis, NLP or AI techniques) and compare the information to that gathered from other sources (as noted above) as well nearby businesses information in order to detect additional business of interest to the user.

Similarly, the system may identify nearby physical business locations in a number of ways, including but not limited to: according to GPS physical location of system user, according to image(s) taken by the user (e.g. through the smartphone camera). The described technologies may use image analysis to detect business names, logos, etc. According to Beacon—business may install a special transmitter (Wifi, Bluetooth or otherwise), known as a Beacon which provides information about the business. According to business Wifi network details (e.g. based on a map of Wifi hotspot information).

The described technologies may allow the user to select the right business among multiple detected ones. A list of offered businesses may be modified based on criteria related to the user (such as preferences, past purchases, visit history, current location etc.).

The described technologies may support a number of possible interactions between the business (merchant) and the person (user). These may be divided into phases including: The handshake phase—in which the user and the merchant establish communication and authenticate each other. Pre-checkout phase—including interaction related to product review and ordering. Checkout phase—in which payment and checkout-related interactions are performed.

The described technologies may also support additional interactions, which may not be related to any specific sales cycle, as further detailed below. In the handshake phase, each of the parties (the user and the merchant) identifies itself to the other party. Once the user and the merchant have been performed a handshake, the described technologies may support functions such as providing the user with the previous invoices/orders from the same merchant, or allowing the user to pay outstanding balance on previous invoices, e.g. pay an outstanding parking ticket to the municipality. This phase includes product browsing, ordering and similar activity—which can occur before final purchase is made.

The described technologies may offer multiple types of interactions with businesses in this stage as further detailed below.

The described technologies may support limited form-factor advertising banners or mini-sites which are displayed inside the VK itself.

The placement of such banners or mini-sites can be made by the system provider (e.g., through business clients contacting directly with the system provider) or through an advertising space exchange mechanism.

The described technologies may provide information about specific preferences of the user using cross-site and cross-transaction information collected by the VK. Such information may be provided to the advertising space exchange mechanism so to select banners relevant to the user preferences. In particular, banners may be placed dynamically based on real-time theme analysis of text sent via the chat channel, e.g. when a user asks his friends via chat "how about noodles?", the system may display banners for nearby Asian restaurants.

Once the user has selected a merchant and performed handshake with it, the system may invoke the merchant's product browsing, selection and ordering pages. Such pages may be displayed, for example, in a pop-up iframe opened for this purpose, so as not to interfere with the user's web site browsing or other activities. Such capability can be integrated with 1-click payment—either based on user's details stored by the merchant, or through an interface between the merchant and the system's back-end server (which may provide payment and shipping information).

As described above, the described technologies may allow a merchant to provide the user with a gift card containing either a given value (amount), or a specific item or set of items. Such a gift card may be sent via instant messaging (or other means) and may include specific claiming conditions for its use (e.g. use only on day X—the recipient's birthday).

As described above, the system may allow a merchant to provide the user with specific product coupons, which are associated with one or more specific pre-paid products sold by a specific merchant. The system may support an offering of multiple such coupons per category, classified and referenced using suitable emoticons. Thus, a flower emoticon could be used to represent a pre-paid flowers order. Users could send such an emoticon to each other as part of a chat discussion. Once a user has determined that he would like to purchase such flowers, he can (for example) touch/select the emoticon to open a menu of relevant flower suppliers (merchants) and order a flower coupon. The relevant vendors may be selected (for example) based on their proximity to the desired user or the product recipient address. The coupon product can be pre-paid by the user, so the recipient can easily receive the flowers based on the voucher sent to him "containing" the product.

The described technologies may support a menu of common relevant products (flowers, chocolate, etc.). This may be a fixed menu or keyboard area in the VK, and could also possibly include additional pop-up menu. Such menus may be changed by user request or according to context (e.g. changing to a Valentine-day-oriented menu during the week before Valentine day and only in countries in which Valentine day is celebrated). Menus could also change dynamically based on the real-time user analysis as noted for VK-based banners and advertising above. Such a capability may be used on-line, but may also be used on premises—a product coupon recipient may visit a coffee-shop and redeem the coupon on the spot.

The described technologies may allow a user to generate a call for participation (CFP) voucher which may be distributed via instant messaging, social networks (e.g. shared on Facebook) or other means. Any recipient of the CFP voucher may "chip in" and pay some or the entire remaining unpaid amount in the CFP voucher. For example, a system user may visit restaurant X, and receive a bill of Y$. The user can then request that the system generate CFP voucher for the amount to be paid (or part of it) with the message (and the associated picture) saying "Hi friends—I'm eating in X and should pay Y$—who wants to chip in?" The user may then share this voucher via chat, as a Facebook status or as a Twitter message. People can join in and pay some or the entire outstanding amount.

The user who created the CFP voucher may view the amount collected so far—either as total amount (textually or graphically as a progress bar) or as a list of top payers by amount of percentage of total. The user may also allow other users to see the current status and/or top payers (or may keep this information protected)—thus creating an instant, focused mini-crowd-funding campaign for specific purchase using the system.

The described technologies may also provide a set of capabilities which may be exercised during the check-out stage, e.g., just before or while completing the transaction. In such a scenario, the described technologies may have access to information about the product purchased, the shipping details (if required) and the pricing and payment information. Such capabilities are described below.

The system may offer complementary products on checkout, e.g., products offered by the same merchant (e.g., "if you buy our widget X, how about buying a complementary Y?"), or products offered by other merchant (e.g. "after you finish eating in restaurant X, come and pick up a tour on our boat at a 20% discount").

The complementary product offered may depend (for example) on the product purchased, product purchase history by the same person, collected user information (including chat information) and various environmental conditions. The complementary product offering may be made at a regular price, a specific discount or for free. It could be an unconditional offer or a conditional offer (e.g. time limited, or depend on the purchase of other products). Such offer may be relevant for both on-line purchases and on-premises purchase.

The described technologies may also offer an alternative or substitute product to that which the user is about the purchase. This is similar to the complementary product offering option describe above, but offers an alternative rather than complementary product. This option may also use the same data and analysis technologies as described above. In the case of alternative product suggestion in the in-premises scenario, the suggested alternative may be in a nearby physical location, but may also be available through on-line purchase. It should be noted that the described technologies may provide this option also during product browsing (i.e. pre-checkout)—when the user reviews a given product, the system would suggest alternatives.

Being that a substantial percentage of the people performing mobile purchase abandon their purchase (and do not complete the purchase) during the credit card data entry phase and that mobile users often find it difficult to enter the details associated with the credit card due to the small mobile keyboard size, the VK may, in certain implementations, be configured to identify that the user is filling a checkout credit card details form, and then: Provide the details which it has available already (such as the user's name and address). Record the additional details provided by the user when such a form is filled for the first time (e.g. credit card number and expiration date). Offer to fill these additional details automatically on the second and subsequent uses. As part of credit card details storage (described above), the described technologies may also store the details of multiple cards owned by the user, and allow the user to select which one to use during checkout.

Thus, the described technologies may allow credit card companies to compete during checkout—provide offers to the user so to convince the user to use a specific card for checkout. Such offers may be based on information gathered about the user and about the purchased product(s) as noted above.

The described technologies may allow a user to maintain a list of "interesting" products. These may include products marked as such by the user, discovered by the described technologies, suggested by the described technologies or suggested by the user friends and contacts in social networks or other mediums. The products in the list can be defined independently of a specific merchant selling this product. Thus, the list may include an entry for a specific digital camera make and model, and may be used for purchase the camera via multiple e-commerce sites. The list may include both physical good and digital goods. This list can serve as a type of persistent clipboard for products, which may be used across multiple sites.

The described technologies may support ordering of products in the list from merchant web sites, or posting of a product descriptor to an instant messaging conversation—with the said descriptor being read by other conversation participants' VK which may add the product to their product list. The discovery of products in a given site may be done in a number of ways, including (for example): By analyzing the site's HTML (or other format) source code to extract product information—a process known as "web scraping". By analyzing the communication path between the user's device and the Internet so as to extract product references from it. Through an application programming interface (API) (web or native) provided by the site and used by the described technologies. For example, an e-commerce web site may provide a web service which allows external systems to interface with its product database. Through an API (web or native) provided by the described technologies, allowing web sites to connect to it and provide relevant information. Through screen capture & analysis (as described for chat program screen analysis above). By analyzing the current browser URL which may contain product information as a parameter.

All of the techniques referenced above may require adaptation to multiple ecommerce sites. These techniques may function automatically, or may require manual action by the user, such copying and pasting information from a displayed web site to be analyzed.

It should also be noted that the described technologies may be also used by service providers which sell various services. These could include consultants, technicians, handyman and other service providers. In this case, the service provider can use the described technologies as any business user (such as e-Shop) would while generating invoices based on templates which describe services rendered. The described technologies can provide an interface to external invoicing and billing system to maintain the business' financial books. The service provider can fill in the details and easily issue an invoice. Such service provider may be a single person using the system, or a business with multiple service representatives as described above.

As described above, the described technologies may collect information about transactions, and perform this collection across multiple web sites use and interactions with multiple businesses via chat.

The described technologies can transfer some of this info to businesses in return for bonuses/loyalty points or similar awards from the specific business. Such transferred information may be processed or statistical in nature and may not necessarily include information related to specific purchases. Furthermore, such information may be segmented according to industry areas—for example, providing only fashion purchases related information to fashion businesses.

The described technologies may also provide its own system-wide user rating badges, which can be shown visually when relevant and could be communicated to relevant businesses. For example, the system could award a "bronze/gold/platinum buyer" badge (or cash tag) to the user according to his level of spending through the system. This indication could be conveyed to businesses, allowing them to offer specific deals and promotions to power users. Note that both types of awards are parallel to any awards made by the credit card companies, which have their own user rating and loyalty point systems.

The described technologies may support interaction between a business and a group of persons performing a joint purchase—known as Business to Group (B2G) interaction. Such interaction may occur with respect to an off-line/on-premises interaction (e.g. a group of friends visiting a restaurant together and dividing the bill between them) or on-line (a group of friends buying a joint birthday present). The described technologies may provide techniques to identify the group members—manually or automatically—as described below. It can also provide a way to divide the payment between the group members as further described below. In certain implementations, the created groups may be ad-hoc while in other implementations the described technologies may support persistent group definitions, e.g. for a group of people which often go to eat together.

The described technologies may provide a number of ways to define a group of users to be used in B2G scenario. These may include, for example: By loading an existing, persistent group definition saved with the described technologies. By importing a set of friend definitions from a social network or instant messaging account. By providing the group organizer with a potential group definition link. The link may then be sent to specific recipients (e.g. via social network, chat or e-mail) which will click on it to confirm their membership. The link may be time-limited, so a user could only join the group by pressing the link X minutes from its sending—preventing confusions and mix-ups with people later joining the group by mistake (when it's not relevant anymore, e.g. the restaurant outing has ended). By editing existing group definitions, e.g. removing some of the group members, adding new group members or merging a number of groups. From the list of event participants in a scheduled event (e.g. a Facebook event) whose membership list can be read.

The described technologies may also support methods of defining a group which are aimed at locating people physically present in the same location. These may include: Using a social network or calendar event (as noted above)—with the event being detected automatically based on the current time and location. By detecting relevant smartphones using a communication method infrastructure which enables such detection, such as Bluetooth device scanning. According to physical (GPS) location, e.g. "add all my Facebook friends which are in the same area". This may be applied as filter to other group definition methods. By detecting common WIFI network, Beacon or similar communication means. Once the group definition is finalized, it can be used for joint ordering, payment or other activities as further described below.

The described technologies may enable receipt of a bill in a number of ways, including: By scanning (via the built-in smartphone camera) an existing printed bill/invoice, and decoding it via OCR. By scanning an existing printed bill/invoice and decoding it via OCR to detect a bill number. This bill number can then be used when connecting to the vendor's system to get the full bill information. The connection may be made via a web service, or—to improve security—via some type of local network/connection. By receiving a structured invoice, provided as detailed data object sent by the vendor's system (e.g. through a web service). By using a QR code (printed on the bill/invoice) which points to a temporary link (e.g. good until payment or for 1 hour) produced by the merchant which stores the invoice data object. By having the business send a payment request (as data object or as URL as above) via instant messaging, e-mail or otherwise. This could be a regular message, or a money request message generated by the described technologies (as described above). The described technologies can also be used to send a minimal bill (including just the bill # and the amount to be paid), or a full bill (which includes details of all products ordered).

Once a bill for payment has been received, the group may use the described technologies to divide the bill between its members. Such division can be done in a number of ways as detailed below. The described technologies can use simple amount division—e.g., by equally dividing the amount to be paid among all group members, or by allowing each group member to determine the amount he or she would pay. The later method may be performed similar to the Call for Participation (CFP) vouchers describe above. The described technologies may also use item-based division—which may be performed if the described technologies have the full bill information, including the per-item prices. In this case the described technologies can display the detailed bill to all group members, and use a collaborative user interface which enables each user to concurrently mark (on his/her smartphone) which items he participates in. The described technologies may provide shared marking, so each user can be presented (in real time) with the marks made by the other users of the group. The described technologies can then calculate the amount to be paid by each user, and charge the relevant amount to each group member.

The described technologies may provide specialized controlled accounts (herein Child Account ('CAC'))—e.g., as may be used as a controlled-spending account whose credentials are given to a child with the account activity monitored and controlled by the parent. This could be used for "child allowance" or similar purposes. The configuration and parameters of the controlled account are set from the controlling Parent Account (PAC).

A CAC may have specialized behaviors and features, such as the ones detailed below: The PAC may suspend or resume financial activity in the CAC. The PAC may deposit or withdraw funds from the CAC. The PAC may limit the persons from which the CAC may receive payments. The PAC may limit the maximal balance which can be held at any given time in the CAC (so the CAC would not be abused). The PAC may limit purchases from the CAC to given items or item categories. This may be performed via white list (e.g. "use only for school books") or black list (e.g. "don't allow alcohol and cigarettes"). The PAC may configure the CAC so that some or all purchases would require PAC owner approval via push notification (e.g. for all purchases above a given amount, in the stores in specific area, or of some item categories). The CAC may be implemented as a separate controlled account, or as virtual account within the PAC (i.e. a specialized way to bill the parent directly).

It should also be understood that the components referenced herein can be combined together or separated into further components, according to a particular implementation. Additionally, in some implementations, various components of a particular device may run on separate machines. Moreover, some operations of certain of the components are described in more detail herein with respect various examples, illustrations, methods, and processes.

It should also be noted that while the technologies described herein are illustrated primarily with respect to secure transaction interfaces and integrating secure transaction capabilities with user communication agents and mobile devices, the described technologies can also be implemented in any number of additional or alternative settings or contexts and towards any number of additional objectives. It should be understood that further technical advantages, solutions, and/or improvements (beyond those described and/or referenced herein) may be enabled as a result of such implementations.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a touchscreen, a light-emitting diode (LED) display, liquid crystal display (LCD), or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying which may embody any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "requesting," "correlating," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. In certain implementations, this apparatus may be specially constructed for the required purposes. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to those referenced herein. The scope of the disclosure should, therefore, be determined with reference to the appended claims, along with the full scope of equivalents to which such claims are entitled.

What is claimed is:

1. A system comprising:
a processing device; and
a memory coupled to the processing device and storing instructions that, when executed by the processing device, cause the system to perform operations comprising:
presenting a user communication agent within a display interface of a device;
presenting, concurrent with a presentation of the user communication agent within the display interface, a user input interface that executes on the device independently of the user communication agent executing on the device, wherein the user input interface is configured to receive one or more inputs that are perceptible to the user communication agent;
while the user communication agent is presented within the display interface, receiving, within the user input interface, a selection of a transaction initiation control, wherein the selection of the transaction initiation control within the user input interface configures the user input interface to receive one or more inputs that are not perceptible to the user communication agent;
while the user communication agent is presented within the display interface, receiving a selection of an identifier presented within the display interface;
in response to the selection of the identifier, presenting a numeric input interface within the display interface;
receiving a numeric input via the numeric input interface;
presenting a transaction confirmation control within the user input interface; and
in response to a selection of the transaction confirmation control, executing a secure transaction with respect to the selected identifier and the numeric input.

2. The system of claim 1, wherein the memory further stores instructions for causing the system to perform operations comprising generating a transaction confirmation record.

3. The system of claim 1, wherein the memory further stores instructions for causing the system to perform operations comprising receiving a selection of an identifier request control.

4. The system of claim 3, wherein the memory further stores instructions for causing the system to perform operations comprising:
generating an identifier creation request; and
transmitting the identifier creation request to one or more users.

5. The system of claim 1, wherein receiving a selection of the identifier further comprises mapping the selected identifier to a secure transaction account.

6. The system of claim 5, wherein the memory further stores instructions for causing the system to perform operations comprising:
in response to a failure of the mapping of the selected identifier to a secure transaction account, generating an enrollment invitation; and transmitting the enrollment invitation to the selected identifier.

7. The system of claim 1, wherein presenting a transaction confirmation control further comprises:
validating the numeric input received via the numeric input interface; and
presenting the transaction confirmation control within the user input interface in response to the validation of the numeric input.

8. The system of claim 1, wherein executing a secure transaction further comprises:
authenticating an identity of an initiator of the secure transaction; and
executing the secure transaction in response to an authentication of the identity of the initiator.

9. The system of claim 1, wherein executing a secure transaction comprises:
transmitting the selected identifier and the numeric input to an external machine; and
receiving transaction confirmation content from the external machine corresponding to the secure transaction.

10. The system of claim 9, wherein the memory further stores instructions for causing the system to perform operations comprising transmitting the transaction confirmation content to a user associated with the selected identifier.

11. The system of claim 1, wherein executing a secure transaction comprises:
generating transaction request content based on the selected identifier and the numeric input;
transmitting the transaction request content to a user associated with the selected identifier;
receiving a transaction confirmation with respect to the transaction request content; and
executing the secure transaction in response to the received transaction confirmation.

12. A method comprising:
presenting a user communication agent within a display interface of a device;
presenting, concurrent with a presentation of the user communication agent within the display interface, a user input interface that executes on the device independently of the user communication agent executing on the device, wherein the user input interface is configured to receive one or more inputs that are perceptible to the user communication agent;
while the user communication agent is presented within the display interface, receiving, within the user input interface, a selection of a transaction initiation control, wherein the selection of the transaction initiation control within the user input interface configures the user input interface to receive one or more inputs that are not perceptible to the user communication agent;
receiving a selection of an identifier presented within the display interface;
in response to the selection of the identifier, presenting a numeric input interface within the display interface;
receiving a numeric input via the numeric input interface;
presenting a transaction confirmation control within the user input interface; and
in response to a selection of the transaction confirmation control, executing a secure transaction with respect to the selected identifier and the numeric input.

13. The method of claim 12, further comprising:
receiving a selection of an identifier request control;
generating an identifier creation request; and
transmitting the identifier creation request to one or more users.

14. The method of claim 12, wherein receiving a selection of the identifier further comprises mapping the selected identifier to a secure transaction account.

15. The method of claim 12, wherein presenting a transaction confirmation control further comprises:
validating the numeric input received via the numeric input interface; and
presenting the transaction confirmation control within the user input interface in response to the validation of the numeric input.

16. The method of claim 12, wherein executing a secure transaction further comprises:
authenticating an identity of an initiator of the secure transaction; and
executing the secure transaction in response to an authentication of the identity of the initiator.

17. The method of claim 12, wherein executing a secure transaction comprises:
transmitting the selected identifier and the numeric input to an external machine; and
receiving transaction confirmation content from the external machine corresponding to the secure transaction.

18. The method of claim 12, wherein executing a secure transaction comprises:
generating transaction request content based on the selected identifier and the numeric input;
transmitting the transaction request content to a user associated with the selected identifier;
receiving a transaction confirmation with respect to the transaction request content; and
executing the secure transaction in response to the received transaction confirmation.

19. A non-transitory computer readable medium having instructions stored thereon that, when executed by a processing device, cause the processing device to perform operations comprising:
presenting a user communication agent within a display interface of a device;
presenting, concurrent with a presentation of the user communication agent within the display interface, a user input interface that executes on the device independently of the user communication agent executing on the device, wherein the user input interface is configured to receive one or more inputs that are perceptible to the user communication agent;
while the user communication agent is presented within the display interface, receiving, within the user input interface, a selection of a transaction initiation control, wherein the selection of the transaction initiation control within the user input interface configures the user input interface to receive one or more inputs that are not perceptible to the user communication agent;
receiving a selection of an identifier presented within the display interface;
in response to the selection of the identifier, presenting a numeric input interface within the display interface;
receiving a numeric input via the numeric input interface;
presenting a transaction confirmation control within the user input interface; and
in response to a selection of the transaction confirmation control, executing a secure transaction with respect to the selected identifier and the numeric input.

20. The non-transitory computer readable medium of claim 19, wherein the instructions further cause the processing device to perform operations comprising:

receiving a selection of an identifier request control;
generating an identifier creation request; and
transmitting the identifier creation request to one or more users.

* * * * *